US010009571B2

(12) United States Patent
Esumi et al.

(10) Patent No.: US 10,009,571 B2
(45) Date of Patent: Jun. 26, 2018

(54) REPRODUCING DEVICE, CONTROL DEVICE, CONTROL METHOD, AND COMPUTER-READABLE STORAGE MEDIUM

(71) Applicant: MITSUBISHI ELECTRIC CORPORATION, Tokyo (JP)

(72) Inventors: Kenji Esumi, Tokyo (JP); Kiyoyasu Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 14/419,454

(22) PCT Filed: Oct. 3, 2013

(86) PCT No.: PCT/JP2013/076929
§ 371 (c)(1),
(2) Date: Feb. 3, 2015

(87) PCT Pub. No.: WO2014/077048
PCT Pub. Date: May 22, 2014

(65) Prior Publication Data
US 2015/0195481 A1 Jul. 9, 2015

(30) Foreign Application Priority Data
Nov. 14, 2012 (JP) .................... 2012-250393

(51) Int. Cl.
*H04N 5/765* (2006.01)
*G06F 21/10* (2013.01)
(Continued)

(52) U.S. Cl.
CPC ............ *H04N 5/765* (2013.01); *G06F 21/10* (2013.01); *G11B 20/00007* (2013.01);
(Continued)

(58) Field of Classification Search
CPC .......... H04N 5/765; H04N 5/76; G11B 20/00; G11B 27/36; G11B 31/00; G11B 27/10;
(Continued)

(56) References Cited

U.S. PATENT DOCUMENTS 7,600,260 B2 * 10/2009 Horii ................... G06F 21/10
369/47.24
8,805,159 B2 8/2014 Esumi et al.
(Continued)

FOREIGN PATENT DOCUMENTS

CN 1674509 A 9/2005
CN 1842798 A 10/2006
(Continued)

OTHER PUBLICATIONS

International Search Report issued in PCT/JP2013/076929, dated Dec. 17, 2013.

*Primary Examiner* — Thai Tran
*Assistant Examiner* — Nien-Ru Yang
(74) *Attorney, Agent, or Firm* — Birch, Stewart, Kolasch & Birch, LLP

(57) ABSTRACT

A reproducing device includes decoding processors and output controllers, and performs synchronous reproduction for reproducing a content item decoded by one of the decoding processors by at least two of the output controllers and separate reproduction for reproducing the content item decoded by one of the decoding processors by one of the output controllers. The reproducing device includes: a manager that manages an allowed number of reproductions of the content item; a determiner that determines, when a reproduction instruction is given, based on the allowed number of reproductions of the content item, whether the separate reproduction is possible and whether the synchronous reproduction is possible; and a controller that performs the separate or synchronous reproduction, based on the
(Continued)

determination. The manager decrements by one the allowed number of reproductions of the content item when the separate reproduction is performed, and does not decrement it when the synchronous reproduction is performed.

14 Claims, 15 Drawing Sheets

(51) Int. Cl.
    *G11B 20/10*     (2006.01)
    *G11B 20/18*     (2006.01)
    *H04N 5/76*     (2006.01)
    *G11B 20/00*     (2006.01)
    *G11B 27/10*     (2006.01)
    *G11B 27/36*     (2006.01)
    *G11B 31/00*     (2006.01)
    *H04N 5/913*     (2006.01)

(52) U.S. Cl.
    CPC .... *G11B 20/10268* (2013.01); *G11B 20/1803* (2013.01); *G11B 27/102* (2013.01); *G11B 27/36* (2013.01); *G11B 31/00* (2013.01); *H04N 5/76* (2013.01); *G11B 2020/00072* (2013.01); *H04N 2005/91328* (2013.01)

(58) Field of Classification Search
    CPC .............. G11B 27/102; G11B 20/2007; G11B 2020/00072; G11B 20/10268; G11B 20/1803; G06F 32/20
    USPC .......................................................... 386/201
    See application file for complete search history.

(56) References Cited

U.S. PATENT DOCUMENTS

| | | |
|---|---|---|
| 2005/0144138 A1 | 6/2005 | Kamibayashi et al. |
| 2005/0228858 A1* | 10/2005 | Mizutani ................. H04L 29/06 709/201 |
| 2007/0112580 A1 | 5/2007 | Tang-Talpin et al. |
| 2008/0056087 A1* | 3/2008 | Ejima .............. G11B 20/00086 369/53.44 |
| 2008/0247731 A1* | 10/2008 | Yamauchi ............... G06F 21/10 386/259 |
| 2012/0069131 A1* | 3/2012 | Abelow ............... G06Q 10/067 348/14.01 |

FOREIGN PATENT DOCUMENTS

| | | |
|---|---|---|
| CN | 1860542 A | 11/2006 |
| CN | 103310815 A | 9/2013 |
| EP | 1 742 441 B1 | 1/2014 |
| JP | 2000-315177 A | 11/2000 |
| JP | 2004-246996 A | 9/2004 |
| JP | 2005-275828 A | 10/2005 |
| JP | 2005-286644 A | 10/2005 |
| JP | 2007-20189 A | 1/2007 |
| JP | 2007-279945 A | 10/2007 |
| JP | 2008-27366 A | 2/2008 |
| JP | 2008-135989 A | 6/2008 |
| JP | 2008-257559 A | 10/2008 |
| JP | 2009-170000 A | 7/2009 |
| JP | 2010-161434 A | 7/2010 |

* cited by examiner

FIG. 4

REPRODUCTION CONFIRMATION SCREEN

A special reproduction instruction has been given.
In which mode is special reproduction to be executed ?

Separate Reproduction Mode
(The number of reproductions will be consumed.)

Synchronous Reproduction Mode
(The number of reproductions will not be consumed.)

Cancel Special Reproduction
(The number of reproductions will not be consumed.)

FIG. 7

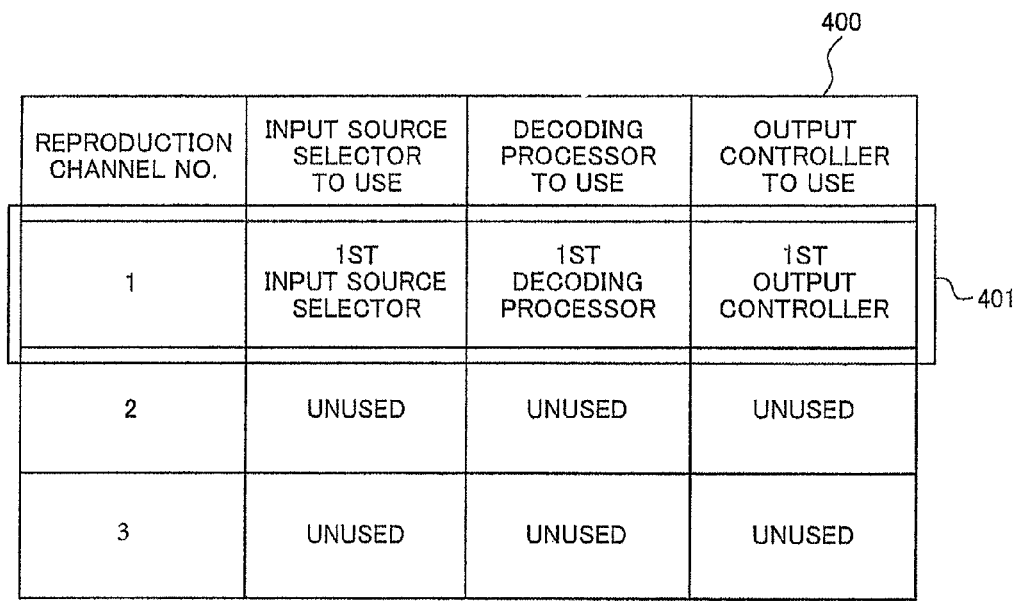

| REPRODUCTION CHANNEL NO. | INPUT SOURCE SELECTOR TO USE | DECODING PROCESSOR TO USE | OUTPUT CONTROLLER TO USE |
|---|---|---|---|
| 1 | 1ST INPUT SOURCE SELECTOR | 1ST DECODING PROCESSOR | 1ST OUTPUT CONTROLLER |
| 2 | UNUSED | UNUSED | UNUSED |
| 3 | UNUSED | UNUSED | UNUSED |

FIG. 8

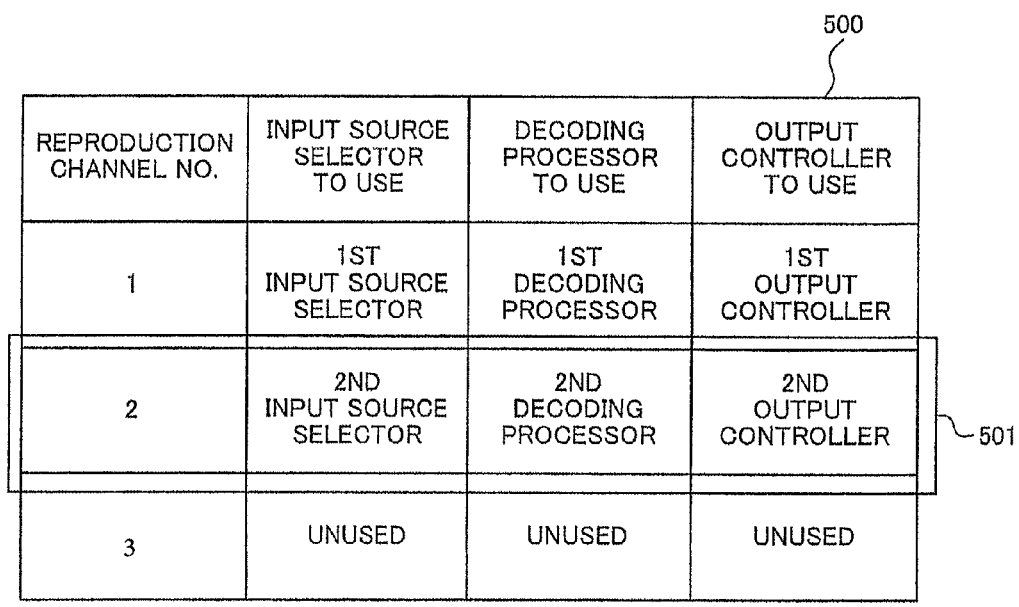

| REPRODUCTION CHANNEL NO. | INPUT SOURCE SELECTOR TO USE | DECODING PROCESSOR TO USE | OUTPUT CONTROLLER TO USE |
|---|---|---|---|
| 1 | 1ST INPUT SOURCE SELECTOR | 1ST DECODING PROCESSOR | 1ST OUTPUT CONTROLLER |
| 2 | 2ND INPUT SOURCE SELECTOR | 2ND DECODING PROCESSOR | 2ND OUTPUT CONTROLLER |
| 3 | UNUSED | UNUSED | UNUSED |

FIG. 17

REPRODUCTION LIST

| | SEPARATE REPRODUCTION | | SYNCHRONOUS REPRODUCTION | | ALLOWED NUMBER OF REPRODUCTIONS |
|---|---|---|---|---|---|
| CONTENT ITEM C11 | SEPARATE REPRODUCTION | ○ | SYNCHRONOUS REPRODUCTION | ○ | ALLOWED NUMBER OF REPRODUCTIONS 3 |
| CONTENT ITEM C12 | SEPARATE REPRODUCTION | ○ | SYNCHRONOUS REPRODUCTION | ○ | ALLOWED NUMBER OF REPRODUCTIONS 0 |
| CONTENT ITEM C13 | SEPARATE REPRODUCTION | ○ | SYNCHRONOUS REPRODUCTION | ○ | |
| CONTENT ITEM C14 | SEPARATE REPRODUCTION | × | SYNCHRONOUS REPRODUCTION | ○ | ALLOWED NUMBER OF REPRODUCTIONS 1 |
| CONTENT ITEM C15 | SEPARATE REPRODUCTION | × | SYNCHRONOUS REPRODUCTION | ○ | |
| CONTENT ITEM C16 | SEPARATE REPRODUCTION | × | SYNCHRONOUS REPRODUCTION | × | |

*FIG. 18*

REPRODUCTION STOP SCREEN

A reproduction stop request has been given.

Stop Reproduction
(The reproduction right will be lost.)

Cancel Stop of Reproduction
(The reproduction right will not be lost.)

REPRODUCING DEVICE, CONTROL DEVICE, CONTROL METHOD, AND COMPUTER-READABLE STORAGE MEDIUM

TECHNICAL FIELD

The present invention relates to a reproducing device, a control device, a control method, and a control program.

BACKGROUND ART

Recently, on-vehicle audio-video (AV) devices become more sophisticated and require support for many multimedia formats and a variety of input sources, including nonvolatile memory devices such as hard disk drives (HDDs), SD card devices, and universal serial bus (USB) memory devices, optical disc devices for compact disks (CDs), digital versatile disks (DVDs), Blu-ray disks (BDs) (registered trademark), or other disks, portable AV players such as mobile audio players and mobile AV players, wireless networks such as wireless fidelity (WiFi), and so on. There is also an increasing demand to enjoy the same or different content on a front passenger seat, a left rear seat, and a right rear seat.

Further, some content items contain information for digital rights management (DRM). Patent Document 1 describes a method for controlling the use of digital rights of the 'Play N times' type of digital audio content items or digital video content items.

PRIOR ART REFERENCES

Patent Documents

Patent Document 1: Japanese Patent Application Publication No. 2007-20189

SUMMARY OF THE INVENTION

Problems to be Solved by the Invention

In a reproducing device having a plurality of reproduction modes to reproduce a content item, when a content item to which limitation on the number of reproductions is imposed is reproduced, the allowed number of reproductions may not be managed appropriately. For example, if the allowed number of reproductions of the content item is decremented by one every time regardless of the reproduction mode, the allowed number of reproductions is redundantly decremented.

An object of the present invention is to provide a reproducing device, a control device, a control method, and a control program capable of appropriately managing the allowed number of reproductions of a content item in accordance with the reproduction mode.

Means for Solving the Problems

A reproducing device according to the present invention includes a plurality of decoding processors for decoding a content item to be reproduced and a plurality of output controllers for reproducing and outputting the content item decoded by one of the plurality of decoding processors. The reproducing device performs synchronous reproduction for reproducing the content item decoded by one of the plurality of decoding processors by at least two of the plurality of output controllers in synchronization and separate reproduction for reproducing the content item decoded by one of the plurality of decoding processors by one of the plurality of output controllers. The reproducing device includes: a number-of-reproductions manager that manages an allowed number of reproductions of the content item; a reproducibility determiner that determines, when a reproduction instruction for the content item with respect to one of the plurality of output controllers is given, on a basis of the allowed number of reproductions of the content item managed by the number-of-reproductions manager, whether the separate reproduction by the output controller to which the reproduction instruction is directed is possible and whether the synchronous reproduction by the output controller to which the reproduction instruction is directed is possible; and a reproduction controller that performs the separate reproduction or the synchronous reproduction by the output controller to which the reproduction instruction is directed, on a basis of the determination by the reproducibility determiner. The number-of-reproductions manager decrements by one the allowed number of reproductions of the content item when the separate reproduction is performed, and does not decrement the allowed number of reproductions of the content item when the synchronous reproduction is performed.

A control device according to the present invention controls a reproducing device. The reproducing device includes a plurality of decoding processors for decoding a content item to be reproduced and a plurality of output controllers for reproducing and outputting the content item decoded by one of the plurality of decoding processors. The reproducing device performs synchronous reproduction for reproducing the content item decoded by one of the plurality of decoding processors by at least two of the plurality of output controllers in synchronization and separate reproduction for reproducing the content item decoded by one of the plurality of decoding processors by one of the plurality of output controllers. The control device includes: a number-of-reproductions manager that manages an allowed number of reproductions of the content item; a reproducibility determiner that determines, when a reproduction instruction for the content item with respect to one of the plurality of output controllers is given, on a basis of the allowed number of reproductions of the content item managed by the number-of-reproductions manager, whether the separate reproduction by the output controller to which the reproduction instruction is directed is possible and whether the synchronous reproduction by the output controller to which the reproduction instruction is directed is possible; and a reproduction controller that performs the separate reproduction or the synchronous reproduction by the output controller to which the reproduction instruction is directed, on a basis of the determination by the reproducibility determiner. The number-of-reproductions manager decrements by one the allowed number of reproductions of the content item when the separate reproduction is performed, and does not decrement the allowed number of reproductions of the content item when the synchronous reproduction is performed.

A control method according to the present invention controls a reproducing device. The reproducing device includes a plurality of decoding processors for decoding a content item to be reproduced and a plurality of output controllers for reproducing and outputting the content item decoded by one of the plurality of decoding processors. The reproducing device performs synchronous reproduction for reproducing the content item decoded by one of the plurality of decoding processors by at least two of the plurality of output controllers in synchronization and separate reproduction for reproducing the content item decoded by one of the plurality of decoding processors by one of the plurality of output controllers. The control method includes: a number-of-reproductions management step that manages an allowed number of reproductions of the content item; a reproducibility determination step that determines, when a reproduction instruction for the content item with respect to one of the plurality of output controllers is given, on a basis of the allowed number of reproductions of the content item managed by the number-of-reproductions management step, whether the separate reproduction by the output controller to which the reproduction instruction is directed is possible and whether the synchronous reproduction by the output controller to which the reproduction instruction is directed is possible; and a reproduction control step that performs the separate reproduction or the synchronous reproduction by the output controller to which the reproduction instruction is directed, on a basis of the determination by the reproducibility determination step. The number-of-reproductions management step decrements by one the allowed number of reproductions of the content item when the separate reproduction is performed, and does not decrement the allowed number of reproductions of the content item when the synchronous reproduction is performed.

A control program according to the present invention controls a reproducing device. The reproducing device includes a plurality of decoding processors for decoding a content item to be reproduced and a plurality of output controllers for reproducing and outputting the content item decoded by one of the plurality of decoding processors. The reproducing device performs synchronous reproduction for reproducing the content item decoded by one of the plurality of decoding processors by at least two of the plurality of output controllers in synchronization and separate reproduction for reproducing the content item decoded by one of the plurality of decoding processors by one of the plurality of output controllers. The control program causes a computer to execute: a number-of-reproductions management step that manages an allowed number of reproductions of the content item; a reproducibility determination step that determines, when a reproduction instruction for the content item with respect to one of the plurality of output controllers is given, on a basis of the allowed number of reproductions of the content item managed by the number-of-reproductions management step, whether the separate reproduction by the output controller to which the reproduction instruction is directed is possible and whether the synchronous reproduction by the output controller to which the reproduction instruction is directed is possible; and a reproduction control step that performs the separate reproduction or the synchronous reproduction by the output controller to which the reproduction instruction is directed, on a basis of the determination by the reproducibility determination step. The number-of-reproductions management step decrements by one the allowed number of reproductions of the content item when the separate reproduction is performed, and does not decrement the allowed number of reproductions of the content item when the synchronous reproduction is performed.

Effect of the Invention

According to the present invention, it is possible to appropriately manage the allowed number of reproductions of a content item in accordance with the reproduction mode.

BRIEF DESCRIPTION OF THE DRAWINGS

FIG. 4 is a drawing showing a reproduction confirmation screen when special reproduction is requested.

FIG. 7 is a drawing showing a resource management information table after recording in a first case.

FIG. 8 is a drawing showing the resource management information table after recording in a second case.

FIG. 17 is a drawing showing an example of display of a reproduction list.

FIG. 18 is a drawing showing a confirmation screen for invalidation of a reproduction right.

MODES FOR CARRYING OUT THE INVENTION

An embodiment of the invention will now be described with reference to the drawings.

<Configuration of Reproducing Device>

Figure 1:
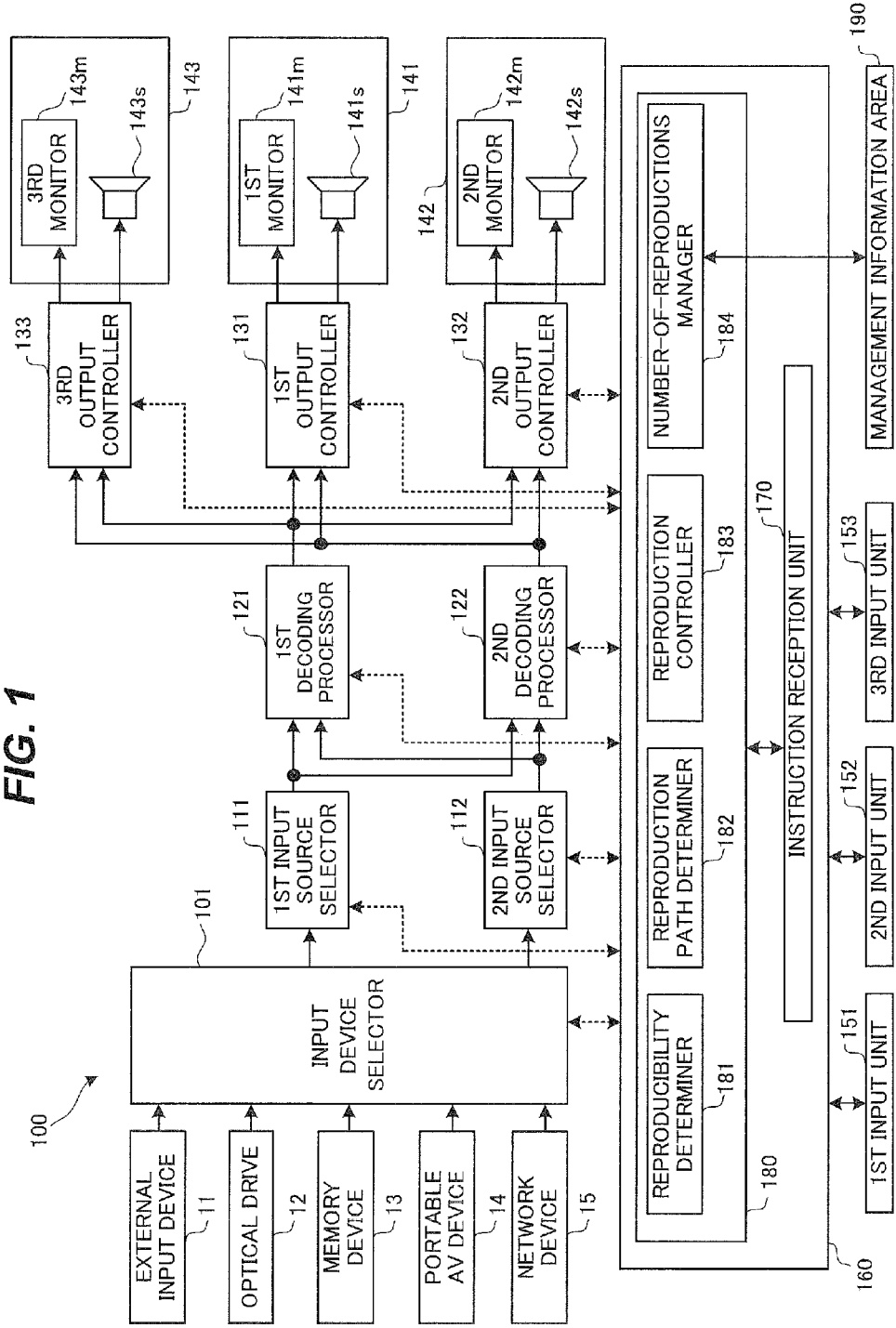
FIG. 1 is a block diagram showing the configuration of a reproducing device in an embodiment.

FIG. 1 is a block diagram showing the configuration of a reproducing device 100 according to the embodiment. The reproducing device 100 reproduces a plurality of content items (specifically, digital data) supplied from one or more input sources (or supply sources). Here, the reproducing device 100 is a video-audio reproducing device for reproducing video-audio content including at least one of video content and audio content.

The reproducing device 100 has a function of managing an allowed number of reproductions of a content item to which limitation on the number of reproductions is imposed, and a function of controlling reproduction of the content item based on the allowed number of reproductions. The limitation on the number of reproductions is intended, for example, to manage or protect the copyright of digital content. A content item to which limitation on the number of reproductions is imposed is referred to as, for example, a DRM content item. In the following description, a content item to which limitation on the number of reproductions is imposed, i.e., a content item having a limited number of reproductions, will be referred to as a 'limited content item'. On the other hand, a content item free from limitation on the number of reproductions will be referred to as an 'unlimited content item'.

FIG. 1 shows, as the one or more input sources, an external input device 11, an optical drive 12, a memory device 13, a portable AV device 14, and a network device 15.

The external input device 11 outputs an analog video-audio signal such as a composite signal, or a digital video-audio signal of HDMI (High-Definition Multimedia Interface, registered trademark), DVI (Digital Visual Interface), or the like. For example, the external input device 11 is a device, such as a BD player or a video deck, having a video-audio output, and supplies its video-audio output to the reproducing device 100 as a composite input or an HDMI input.

The optical drive 12 is a device for reading an optical disc such as a CD, DVD, or BD. Here, the optical drive 12 is included in the reproducing device 100. Optical discs (not shown) on which moving picture files, music files, still picture files, or the like are recorded can be inserted into the optical drive 12. Audio formats of content items recorded in the optical discs include CD-DA or the like; video formats include DVD-VIDEO, BD-VIDEO, or the like. On request, the optical drive 12 reads an optical disc inserted in the optical drive 12 to output media information of the optical disc and the video-audio data.

The memory device 13 is a nonvolatile memory device such as an SD card, a USB memory, or a HDD. Moving picture files, music files, still picture files, or the like can be recorded in the memory device 13 in the same way as in the optical discs. In response to a request from the reproducing device 100, the memory device 13 outputs video-audio data to the reproducing device 100.

The portable AV device 14 is, for example, a sophisticated mobile phone, a portable audio player, or a portable AV player. The portable AV device 14 is roughly classified into three types (or output forms). The first type is recognized as a memory device and operates like the memory device 13. The second type is USB-connected to the reproducing device 100 to be subjected to reproduction control of the reproducing device 100, performs decoding on the portable AV device 14 side, and outputs a video-audio signal to the reproducing device 100 like the external input device 11. The third type is USB-connected to the reproducing device 100 to be subjected to reproduction control of the reproducing device 100, and outputs streaming data to the reproducing device 100.

The network device 15 is a device for accessing a network (not shown) such as the Internet or a data communication network for mobile phones. The network device 15 may reproduce content on the network in a streaming mode of reproducing the content while receiving the data of the content, or in a download mode of downloading the data of the content into a nonvolatile memory such as the memory device 13 and then reproducing the content from the nonvolatile memory.

The video-audio signal mentioned above is a signal including at least one of a video signal and an audio signal. The video-audio data mentioned above are data including at least one of video data and audio data.

The reproducing device 100 includes an input device selector 101, a first input source selector 111, a second input source selector 112, a first decoding processor 121, a second decoding processor 122, a first output controller 131, a second output controller 132, a third output controller 133, a first output unit 141, a second output unit 142, a third output unit 143, a first input unit 151, a second input unit 152, a third input unit 153, and a control device 160. In the following description, as appropriate, the first input source selector 111 and second input source selector 112 will be referred to as 'input source selectors'. Likewise, the first decoding processor 121 and second decoding processor 122 will be referred to as 'decoding processors'; the first output controller 131, second output controller 132, and third output controller 133 will be referred to as 'output controllers'; the first output unit 141, second output unit 142, and third output unit 143 will be referred to as 'output units'; the first input unit 151, second input unit 152, and third input unit 153 will be referred to as 'input units'.

The input device selector 101 has interfaces for connecting with the input sources (in this example, the above input devices 11 to 15). The input device selector 101 detects input sources connected with the input device selector 101 and notifies the control device 160 of the detection result. For example, the input device selector 101 determines the presence or absence of an video-audio signal from the external input device 11, and notifies the control device 160 of information indicating the presence or absence of an externally input video-audio signal. When an optical disc is inserted in the optical drive 12, the input device selector 101 acquires media information of the optical disc from the optical drive 12 and sends the media information to the control device 160. When the optical disc is removed from the optical drive 12, the input device selector 101 notifies the control device 160 that the optical disc has been removed. The input device selector 101 detects the insertion and removal of the memory device 13 and sends the detection result as memory device status information to the control device 160. When the portable AV device 14 is connected, the input device selector 101 determines which of the above three output forms the device has and sends portable AV device information indicating the output form to the control device 160. When no portable AV device 14 is connected, the input device selector 101 sends portable AV device information indicating the disconnected state to the control device 160. The input device selector 101 monitors network communication status, determines whether the network or the network device 15 is available for use, and sends the result of the determination as network availability information to the control device 160. The above various information is used for control by the control device 160, and displayed on the output units, for example.

When a content item recorded in an input source is reproduced, the input device selector 101 obtains the content item to be reproduced from the input source and sends it to a subsequent input source selector. For example, when a content item recorded on an optical disc in the optical drive 12 is reproduced, the input device selector 101 makes a read request to the optical drive 12, reads video-audio data of the content item from the optical drive 12, and outputs them to a subsequent input source selector. Also for example, when a content item recorded in the memory device 13 is reproduced, the input device selector 101 makes a read request to the memory device 13, reads video-audio data of the content item from the memory device 13, and outputs them to a subsequent input source selector.

The first input source selector 111 selects a content item to be reproduced from among the plurality of content items supplied from the one or more input sources, and outputs it to one of the decoding processors. Specifically, the first input source selector 111 selects a content item to be reproduced in accordance with a command from a reproduction controller 183 (described later), acquires the content item (specifically, video-audio signal, video-audio data, or streaming data) from the input source corresponding to the content item through the input device selector 101, and processes the content item to output it to a subsequent decoding processor. The first input source selector 111 has a demultiplexing (DEMUX) function; when receiving video-audio data or streaming data from the input device selector 101, the first input source selector 111 demultiplexes the data into video stream data, audio stream data, and auxiliary stream data for a caption or the like, and outputs the obtained stream data to a decoding processor. When receiving a video-audio signal from the input device selector 101, the first input source selector 111 simply passes the video-audio signal to a subsequent decoding processor. The second input source selector 112 performs processing similar to that of the first input source selector 111.

The first decoding processor 121 decodes a content item selected by the first input source selector 111 or second input source selector 112, and outputs the decoded content item. Specifically, the first decoding processor 121 decodes stream data, such as video stream data or audio stream data, output from the first input source selector 111 or second input source selector 112 to convert them into a video-audio signal, and outputs the obtained video-audio signal to one or more of the subsequent output controllers 131 to 133. For example, the first decoding processor 121 outputs the decoded video signal and audio signal in mutual synchronization. The first decoding processor 121 includes, for example, a video decoding processing section for decoding video stream data, an audio decoding processing section for decoding audio stream data, and a caption decoding processing section for decoding auxiliary stream data for a caption or the like. When the first decoding processor 121 receives a video-audio signal from an input source selector, decoding is unnecessary, so the first decoding processor 121 simply passes the video-audio signal to one or more of the subsequent output controllers. The second decoding processor 122 performs processing similar to that of the first decoding processor 121.

The first output controller 131 reproduces and outputs a video-audio signal, which is a decoded content item, from a decoding processor (the first decoding processor 121 or second decoding processor 122) to the first output unit 141. Specifically, the first output controller 131 superimposes the video signal of a graphic screen such as a graphic user interface (GUI) generated by the control device 160 on a video signal from the decoding processor, and reproduces and outputs the obtained video signal to a first monitor 141*m* in the first output unit 141. The first output controller 131 also reproduces and outputs an audio signal from the decoding processor to a first speaker 141*s* in the first output unit 141. The second output controller 132 performs processing similar to that of the first output controller 131, reproduces and outputs a video signal to a second monitor 142*m* in the second output unit 142, and reproduces and outputs an audio signal to a second speaker 142*s* in the second output unit 142. The third output controller 133 performs processing similar to that of the first output controller 131, reproduces and outputs a video signal to a third monitor 143*m* in the third output unit 143, and reproduces and outputs an audio signal to a third speaker 143*s* in the third output unit 143.

The first output unit 141 outputs a content item from the first output controller 131, and includes the first monitor 141*m* for displaying a video signal and the first speaker 141*s* for outputting an audio signal. The second output unit 142 outputs a content item from the second output controller 132, and includes the second monitor 142*m* for displaying a video signal and the second speaker 142*s* for outputting an audio signal. The third output unit 143 outputs a content item from the third output controller 133, and includes the third monitor 143*m* for displaying a video signal and the third speaker 143*s* for outputting an audio signal. For example, in a vehicle environment, the first monitor 141*m* and first speaker 141*s* are a monitor and headphones for a right rear seat, the second monitor 142*m* and second speaker 142*s* are a monitor and headphones for a left rear seat, and the third monitor 143*m* and third speaker 143*s* are a monitor and an in-vehicle speaker of a vehicle navigation system (not shown) or the like placed in a front seat.

Each of the first input unit 151, second input unit 152, and third input unit 153 is a user interface, such as a remote control or a touch panel, for receiving input from a user. The first input unit 151 receives instructions pertaining to reproduction by the first output unit 141, the second input unit 152 receives instructions pertaining to reproduction by the second output unit 142, and the third input unit 153 receives instructions pertaining to reproduction by the third output unit 143. For example, in a vehicle environment, the first input unit 151, second input unit 152, and third input unit 153 are input units for a right rear seat, a left rear seat, and a front seat, respectively.

The channel (system or set of functional blocks) for reproducing content by a particular output unit (or output controller) will be referred to as a 'reproduction channel'. The example of FIG. 1 has a first reproduction channel for reproducing content by the first output unit 141, a second reproduction channel for reproducing content by the second output unit 142, and a third reproduction channel for reproducing content by the third output unit 143. The first input unit 151, second input unit 152, and third input unit 153 correspond to the first reproduction channel, second reproduction channel, and third reproduction channel, respectively, and receive instructions pertaining to reproduction on the corresponding reproduction channels.

The control device 160 controls the various units of the reproducing device 100 to control the operation of the reproducing device 100, and is composed of, for example, a CPU (Central Processing Unit). The control device 160 includes an instruction reception unit 170 and a controller 180.

The instruction reception unit 170 receives an instruction for reproduction of a particular content item by a particular output unit of the output units. The instruction reception unit 170 receives a reproduction instruction for one of the content items with respect to one of the output controllers 131 to 133. That is, the instruction reception unit 170 receives a reproduction instruction to reproduce one of the content items by one of the output controllers. In this example, the instruction reception unit 170 receives instructions pertaining to reproduction of content by the first output unit 141 through the first input unit 151, receives instructions pertaining to reproduction of content by the second output unit 142 through the second input unit 152, and receives instructions pertaining to reproduction of content by the third output unit 143 through the third input unit 153. Instructions pertaining to reproduction include, for example, a reproduction instruction (or reproduction start instruction) to start reproduction, a reproduction stop instruction to stop reproduction, and a special reproduction instruction to execute special reproduction, which includes fast-forward, fast-rewind, pause, frame advance, frame reverse, and the like.

The controller 180 uses the input source selectors, decoding processors, and output controllers to control reproduction of content by the respective output units, in accordance with instructions received by the instruction reception unit 170. The reproduction of content includes synchronous reproduction for reproducing a content item decoded by one of the decoding processors by at least two of the output controllers in synchronization, and separate reproduction for reproducing a content item decoded by one of the decoding processors by one of the output controllers. Reproducing in synchronization includes reproducing simultaneously and reproducing with a constant time lag. The separate reproduction may be also referred to as asynchronous reproduction. The controller 180 manages the control of reproduction on each reproduction channel and, for each reproduction channel, gives reproduction control commands to the input source selector, decoding processor, and output controller used in the reproduction channel, performing start of reproduction of content, stop of reproduction, special reproduction such as fast-forward and fast-reverse, processing for resume reproduction, or the like. In addition, the controller 180 has a function of managing the allowed number of reproductions of a limited content item (or the number of times the limited content item can be reproduced), and a function of controlling reproduction of the limited content item on the basis of the allowed number of reproductions.

When a reproduction instruction for a content item is given, the controller 180 determines whether separate reproduction of the content item (referred to below as the 'requested content item') to which the reproduction instruction is directed by the output controller (referred to below as the 'requested output controller') to which the reproduction instruction is directed is possible, and whether synchronous reproduction of the requested content item by the requested output controller is possible. Specifically, when the instruction reception unit 170 receives a reproduction instruction for a content item, the controller 180 determines whether it is possible to perform separate reproduction of the requested content item by the requested output controller by use of a decoding processor not being used for reproduction by another output controller other than the requested output controller, and whether it is possible to perform, by use of a decoding processor being used for reproduction of the requested content item by another output controller other than the requested output controller, synchronous reproduction of the requested content item by the requested output controller and the other output controller. On the basis of the determination, the controller 180 performs separate reproduction or synchronous reproduction of the requested content item.

In the following description, another output controller other than the requested output controller will be referred to as 'another output controller' in some cases. Likewise, another reproduction channel (or output unit) other than the reproduction channel (or output unit) to which a reproduction instruction is directed will be referred to as 'another reproduction channel (or output unit)' in some cases.

For example, when a reproduction instruction for a content item is received, the controller 180 determines whether separate reproduction of the content item is possible, and if it is possible, performs the separate reproduction by using a decoding processor available for the separate reproduction from among the decoding processors. On the other hand, if it is determined that separate reproduction of the content item is not possible, the controller 180 determines whether the content item is already being reproduced on another reproduction channel, and if so, performs reproduction (synchronous reproduction) of the content item by using the decoding processor used in the other reproduction channel (or the decoded content item in the other reproduction channel). In the synchronous reproduction, the output unit (referred to below as the 'requested output unit') to which the reproduction instruction is directed and another output unit perform reproduction in synchronization with each other.

When the instruction reception unit 170 receives a reproduction stop instruction or a special reproduction instruction, the controller 180 controls the decoding processor and output controller used in the reproduction channel to which the instruction is directed, thereby performing reproduction stop or special reproduction on the reproduction channel to which the instruction is directed.

In FIG. 1, the controller 180 includes a reproducibility determiner 181, a reproduction path determiner 182, the reproduction controller 183, and a number-of-reproductions manager 184.

The number-of-reproductions manager 184 manages the allowed numbers of reproductions (or remaining numbers of reproductions) of limited content items out of the content items supplied from the input sources. In this example, a management information area 190 stores management information, which includes, for each limited content item, allowed-number-of-reproductions information indicating the allowed number of reproductions of the content item, and reproduction right presence/absence information indicating the presence or absence of the reproduction right of the content item. The number-of-reproductions manager 184 manages the management information stored in the management information area 190. The management information area 190 is located in a device in which the limited content item is recorded, a nonvolatile memory in the reproducing device 100, a content management server that manages the limited content item and is accessible from the network device 15, or the like. The reproduction right presence/absence information is information for managing a time period during which the reproduction is allowed by virtue of a decrement of the allowed number of reproductions. The reproduction right presence/absence information is set to either 'presence' indicating that the reproduction right exists (or is valid), or 'absence' indicating that the reproduction right does not exist (or is invalid).

The reproducibility determiner 181 determines, when the instruction reception unit 170 receives a reproduction instruction, whether reproduction of the requested content item by one of the decoding processors is possible. Specifically, the reproducibility determiner 181 determines whether separate reproduction of the requested content item is possible, and whether synchronous reproduction of the requested content item is possible. More specifically, when a reproduction instruction for a content item is given, the reproducibility determiner 181 determines whether it is possible to perform separate reproduction of the requested content item by the requested output controller by use of a decoding processor not being used for reproduction by another output controller other than the requested output controller, and whether it is possible to perform, by use of a decoding processor being used for reproduction of the requested content item by another output controller other than the requested output controller, synchronous reproduction of the requested content item by the requested output controller and the other output controller. When a reproduction instruction for a content item is given, the reproducibility determiner 181 determines whether separate reproduction is possible and whether synchronous reproduction is possible, on the basis of the usage status of the one or more input source selectors and decoding processors, and additionally, if the requested content item is a limited content item, on the basis of the allowed number of reproductions of the requested content item managed by the number-of-reproductions manager 184.

When determining whether separate reproduction of a limited content item is possible, the reproducibility determiner 181 determines that the separate reproduction is possible if the allowed number of reproductions of the content item is one or more, and determines that the separate reproduction is not possible if the allowed number of reproductions is zero. At this time, the reproduction right presence/absence information is not used. In this example, the reproducibility determiner 181 determines, on the basis of the usage status of the decoding processors, whether there is a decoding processor available for separate reproduction, determines that the separate reproduction is possible if it is determined that there is such a decoding processor and the allowed number of reproductions is one or more, and determines that the separate reproduction is not possible if it is determined that there is no such decoding processor or if the allowed number of reproductions is zero. On the other hand, when determining whether separate reproduction of an unlimited content item is possible, the reproducibility determiner 181 determines, on the basis of the usage status of the decoding processors, whether there is a decoding processor available for separate reproduction, determines that the separate reproduction is possible if it is determined that there is such a decoding processor, and determines that the separate reproduction is not possible if it is determined that there is no such decoding processor.

When determining whether synchronous reproduction of a content item is possible, regardless of whether the content item is a limited content item and regardless of the allowed number of reproductions of the content item, the reproducibility determiner 181 determines that the synchronous reproduction is possible if the content item is being reproduced by another output controller other than the requested output controller, and determines that the synchronous reproduction is not possible if it is not being reproduced. However, when determining whether synchronous reproduction of a limited content item is possible, the reproducibility determiner 181 may determine whether the reproduction right presence/absence information of the limited content item is valid, and only if it is valid, determine that the synchronous reproduction of the limited content item is possible.

For example, when a first content item is already being reproduced by one of the decoding processors (i.e., a first content item is already being reproduced on another reproduction channel) and the instruction reception unit 170 receives a new reproduction instruction for a second content item, the reproducibility determiner 181 determines whether reproduction (i.e., separate reproduction) of the second content item by use of a decoding processor differing from the decoding processor being used for reproduction of the first content item is possible. If determining that the separate reproduction is not possible, the reproducibility determiner 181 determines whether the second content item (i.e., requested content item) is identical to the first content item (i.e., content item already being reproduced on another reproduction channel), determines that the synchronous reproduction is possible if they are identical, and determines that the synchronous reproduction is not possible if they are not identical.

The reproduction path determiner 182 determines a reproduction path, which may be also referred to as a 'signal path', for reproducing the requested content item. The reproduction path determiner 182 determines, on the basis of the determination by the reproducibility determiner 181, from among the decoding processors 121 to 122 and output controllers 131 to 133, the decoding processor and output controller to be used to reproduce the requested content item. Specifically, when the reproducibility determiner 181 determines that the separate reproduction is possible, the reproduction path determiner 182 determines, from among the decoding processors, a decoding processor available for the separate reproduction as the decoding processor to be used to reproduce the requested content item, and determines the output controller corresponding to the requested output unit as the output controller to be used to reproduce the requested content item. When the reproducibility determiner 181 determines that the requested content item (second content item) is identical to a content item (first content item) already being reproduced on another reproduction channel, the reproduction path determiner 182 determines the decoding processor being used in the other reproduction channel (decoding processor being used for the reproduction of the first content item) as the decoding processor to be used to reproduce the requested content item, and determines the output controller corresponding to the requested output unit as the output controller to be used to reproduce the requested content item.

The reproduction controller 183 controls the input source selectors, decoding processors, and output controllers to control reproduction of content, in accordance with instructions (or user operation events) received by the instruction reception unit 170. When the instruction reception unit 170 receives a reproduction instruction for a content item, the reproduction controller 183 performs separate reproduction or synchronous reproduction of the requested content item by the requested output controller, on the basis of the determination by the reproducibility determiner 181. Specifically, when it is determined that the separate reproduction is possible, the reproduction controller 183 performs the separate reproduction of the requested content item by the requested output controller by use of a decoding processor not being used for reproduction by another output controller other than the requested output controller; when it is determined that the synchronous reproduction is possible, the reproduction controller 183 performs, by use of a decoding processor being used for reproduction of the requested content item by another output controller other than the requested output controller, the synchronous reproduction of the requested content item by the requested output controller and the other output controller. In the example of FIG. 1, the reproduction controller 183 uses the decoding processor and output controller determined by the reproduction path determiner 182 to perform control to perform reproduction (separate reproduction or synchronous reproduction) of the requested content item by the requested output unit.

When the requested content item is a limited content item, the number-of-reproductions manager 184 decrements by one the allowed number of reproductions of the content item when separate reproduction of the content item is performed, and does not decrement the allowed number of reproductions of the content item when synchronous reproduction of the content item is performed. When separate reproduction of a limited content item is performed, if the reproduction right presence/absence information of the content item is 'absence', the number-of-reproductions manager 184 decrements by one the allowed number of reproductions of the content item, and updates the reproduction right presence/absence information of the content item to 'presence'. When the number-of-reproductions manager 184 detects a predetermined event that invalidates the reproduction right of a content item, it updates the reproduction right presence/absence information of the content item to 'absence'. The number-of-reproductions manager 184 may manage a plurality of reproduction right presence/absence information items for a limited content item. For example, in a case where separate reproduction of a first limited content item is performed and then separate reproduction of a second limited content item identical to the first limited content item is performed while the first limited content item is being reproduced, the number-of-reproductions manager 184 may update the reproduction right presence/absence information for the first limited content item to 'presence' at the time of the separate reproduction of the first limited content item, update the reproduction right presence/absence information for the second limited content item to 'presence' at the time of the separate reproduction of the second limited content item, and separately manage these reproduction right presence/absence information items.

The control device 160 may further have functions described in the following items (A) to (E):

(A) While synchronous reproduction of a limited content item by two or more output controllers is being performed, when the control device 160 receives a reproduction stop instruction with respect to one of the two or more output controllers, it stops the reproduction of the content item by the output controller to which the stop instruction is directed, and continues the reproduction of the content item by the other one or more of the two or more output controllers. In this case, for example, the control device 160 keeps the reproduction right presence/absence information for the content item 'presence', and does not invalidate the reproduction right of the content item.

Figure 2:
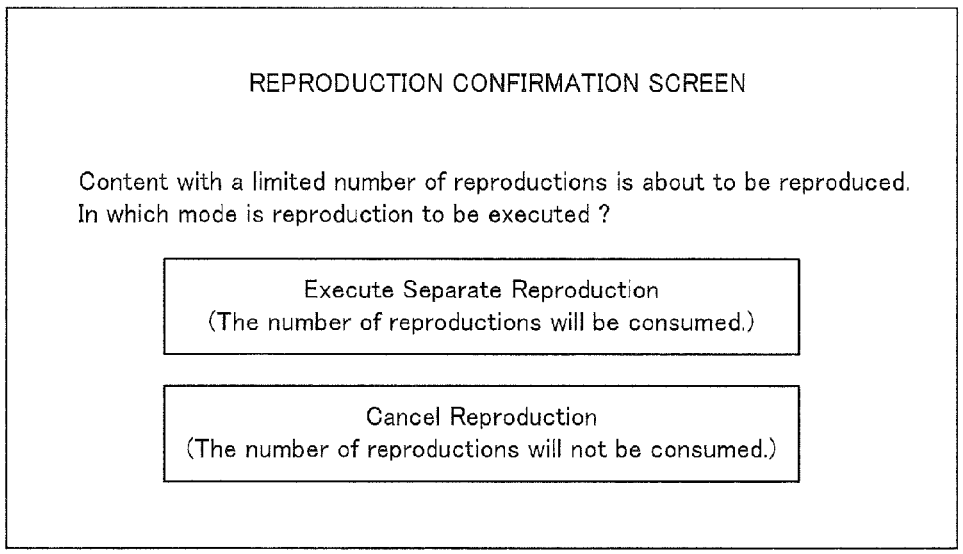
FIG. 2 is a drawing showing a reproduction confirmation screen when synchronous reproduction is not possible.

(B) When the reproducibility determiner 181 determines that separate reproduction of a limited content item is possible, the control device 160 indicates that the allowed number of reproductions of the content item is decremented if the separate reproduction is executed, receives from a user a selection as to whether to execute the separate reproduction, and executes the separate reproduction if the execution of the separate reproduction is selected. For example, the control device 160 causes the requested output unit to display a reproduction confirmation screen as shown in FIG. 2. The reproduction confirmation screen of FIG. 2 is configured to indicate that the allowed number of reproductions is consumed in a separate reproduction mode and the allowed number of reproductions is not consumed if the reproduction is not executed, and receive from a user a selection of one of the separate reproduction mode and cancellation of reproduction (cancel reproduction). The control device 160 executes the separate reproduction if the separate reproduction mode is selected by the user, and does not execute reproduction if cancellation of reproduction is selected.

Figure 3:
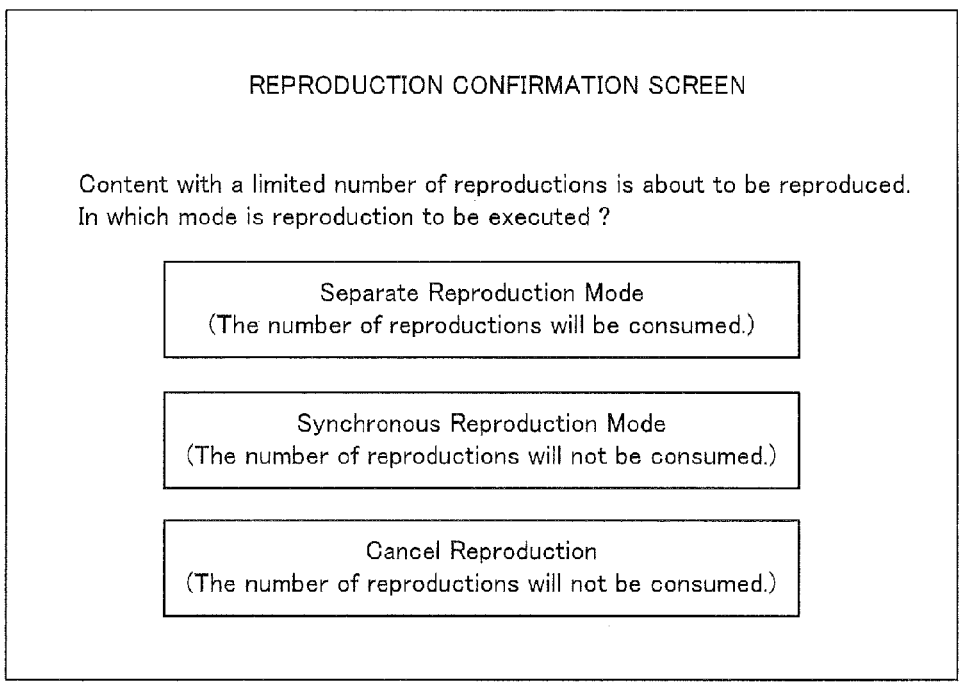
FIG. 3 is a drawing showing a reproduction confirmation screen when synchronous reproduction is possible.

(C) When the reproducibility determiner 181 determines that separate reproduction and synchronous reproduction of a limited content item are possible, the control device 160 indicates that the allowed number of reproductions of the content item is decremented if the separate reproduction is executed and the allowed number of reproductions of the content item is not decremented if the synchronous reproduction is executed, receives from a user a selection as to which of the separate reproduction and synchronous reproduction is to be executed, and executes reproduction selected by the user. For example, the control device 160 causes the requested output unit to display a reproduction confirmation screen as shown in FIG. 3. The reproduction confirmation screen of FIG. 3 is configured to indicate that the allowed number of reproductions is consumed in a separate reproduction mode and the allowed number of reproductions is not consumed in a synchronous reproduction mode or if the reproduction is not executed, and receive from a user a selection of one of the separate reproduction mode, synchronous reproduction mode, and cancellation of reproduction (cancel reproduction). The control device 160 executes the separate reproduction if the separate reproduction mode is selected by the user, executes the synchronous reproduction if the synchronous reproduction mode is selected, and does not execute reproduction if cancellation of reproduction is selected.

(D) While synchronous reproduction of a content item by two or more output controllers is being performed, when the control device 160 receives a special reproduction instruction with respect to one of the two or more output controllers, it executes special reproduction by the output controller to which the special reproduction instruction is directed, by decoding the content item using a decoding processor differing from the decoding processor being used for the synchronous reproduction of the content item, and continues the reproduction of the content item by the other one or more of the two or more output controllers, to which the special reproduction instruction is not directed. For example, while synchronous reproduction of a content item by two or more output controllers is being performed, when the control device 160 receives a special reproduction instruction with respect to one of the two or more output controllers, determines whether it is possible to perform reproduction (i.e., separate reproduction) of the content item by the output controller to which the special reproduction instruction is directed by use of a decoding processor differing from that for the other one or more of the two or more output controllers, differing from the output controller to which the special reproduction instruction is directed, and if determining that it is possible, executes the special reproduction (i.e., special reproduction in the separate reproduction mode) of the content item by the output controller to which the special reproduction instruction is directed by use of the decoding processor differing from that for the other one or more output controllers, continuing the reproduction of the content item by the other one or more output controllers. At this time, if the number of the other one or more output controllers is one, the reproduction mode of the other output controller shifts from the synchronous reproduction mode to the separate reproduction mode.

(E) In the above item (D), when the control device 160 determines that the separate reproduction of the content item by the output controller to which the special reproduction instruction is directed is possible, it indicates that the allowed number of reproductions of the content item is decremented if reproduction (i.e., separate reproduction) using a decoding processor differing from that for the other one or more output controllers is executed and the allowed number of reproductions of the content item is not decremented if reproduction (i.e., synchronous reproduction) using the same decoding processor as the other one or more output controllers is executed, receives from a user a selection as to which of the separate reproduction and synchronous reproduction is to be executed, and executes reproduction selected by the user. For example, the control device 160 causes the output controller to which the special reproduction instruction is directed to display a reproduction confirmation screen as shown in FIG. 4. The reproduction confirmation screen of FIG. 4 is configured to indicate that the allowed number of reproductions is consumed if the special reproduction is executed in the separate reproduction mode and the allowed number of reproductions is not consumed if the special reproduction is executed in the synchronous reproduction mode or if the special reproduction is not executed, and receive from a user a selection of one of the separate reproduction mode, synchronous reproduction mode, and cancellation of special reproduction (cancel special reproduction). The control device 160 executes the special reproduction in the separate reproduction mode if the separate reproduction mode is selected by the user, executes the special reproduction in the synchronous reproduction mode if the synchronous reproduction mode is selected, and does not execute the special reproduction if cancellation of special reproduction is selected. When the synchronous reproduction mode is selected, the control device 160 may continue normal reproduction in the synchronous reproduction mode, instead of executing special reproduction.

In one specific aspect, the reproducibility determiner 181, reproduction path determiner 182, reproduction controller 183, and number-of-reproductions manager 184 are configured as follows.

Upon receiving a reproduction instruction for a content item, at a first stage, without consideration of limitation of the number of reproductions (or allowed number of reproductions) of the content item, on the basis of the usage status of the resources (decoding processors etc.) for reproducing content, the reproducibility determiner 181 determines whether separate reproduction of the requested content item is possible. If it is determined at the first stage that the separate reproduction is possible, at a second stage, the reproducibility determiner 181 determines whether the requested content item is a limited content item, and if it is not a limited content item, finally determines that the separate reproduction is possible. If it is a limited content item, the reproducibility determiner 181 finally determines, on the basis of the allowed number of reproductions of the requested content item, whether the separate reproduction is possible. If it is determined at the first stage or second stage that the separate reproduction is not possible, the reproducibility determiner 181 determines whether synchronous reproduction of the requested content item is possible.

Specifically, upon receiving a reproduction instruction for a content item from a user, at the first stage, on the basis of the usage status of the one or more input source selectors and decoding processors, the reproducibility determiner 181 determines whether the one or more input source selectors include an input source selector available for separate reproduction of the content item (e.g., an input source selector not being used for reproduction), whether the decoding processors include a decoding processor available for separate reproduction of the content item (e.g., a decoding processor not being used for reproduction), and whether the input source corresponding to the content item is available for separate reproduction of the content item. If there is an available input source selector, there is an available decoding processor, and the input source is available, the reproducibility determiner 181 determines that the separate reproduction is possible; otherwise it determines that the separate reproduction is not possible.

When it is determined at the first stage that the separate reproduction is possible, at the second stage, the reproducibility determiner 181 determines whether the requested content item is a limited content item. If it is not a limited content item, the reproducibility determiner 181 determines that the separate reproduction is possible, and sends the reproduction path determiner 182 reproduction mode information indicating that separate reproduction is available.

On the other hand, if it is a limited content item, the reproducibility determiner 181 sends the number-of-reproductions manager 184 a number-of-reproductions confirmation notification for confirming whether the allowed number of reproductions of the content item is more than zero, and on the basis of a response from the number-of-reproductions manager 184, if the allowed number of reproductions is zero, determines that the separate reproduction is not possible. On the other hand, if the allowed number of reproductions is more than zero, the reproducibility determiner 181 determines that the separate reproduction is possible, displays a confirmation screen (e.g., the reproduction confirmation screen of FIG. 2) for confirming with a user whether to consume the allowed number of reproductions, and if the confirmation result indicates a reproduction instruction, sends the reproduction path determiner 182 reproduction mode information that indicates that the separate reproduction mode is available, and includes information indicating that the number of reproductions is limited. If the confirmation result indicates cancellation of the reproduction instruction, the reproducibility determiner 181 cancels the reproduction instruction.

When it is determined at the first stage or second stage that the separate reproduction is not possible, the reproducibility determiner 181 determines whether reproduction of the requested content item is being performed on another reproduction channel other than the reproduction channel to which the reproduction instruction is directed. If so, it determines that the synchronous reproduction is possible; if not, it determines that the synchronous reproduction is not possible. When it is determined that the synchronous reproduction is possible, the reproducibility determiner 181 sends the reproduction path determiner 182 reproduction mode information indicating that the synchronous reproduction mode is available.

On the basis of the reproduction mode information sent from the reproducibility determiner 181, if the separate reproduction mode is available, the reproduction path determiner 182 determines, as a reproduction path, a path including an input source selector and a decoding processor that are available for separate reproduction; if the synchronous reproduction mode is available, it determines, as a reproduction path, a path including the input source selector and decoding processor that are being used in the other reproduction channel that is currently reproducing the requested content item. Then, the reproduction path determiner 182 sends a reproduction path determination notification to the reproduction controller 183. If the reproduction mode information from the reproducibility determiner 181 includes information indicating that the number of reproductions is limited, the reproduction path determiner 182 sends the reproduction controller 183 the reproduction path determination notification that includes information indicating that the number of reproductions is limited.

The reproduction controller 183 receives the reproduction path determination notification from the reproduction path determiner 182 and controls the input source selector, decoding processor, and output controller included in the reproduction path determined by the reproduction path determiner 182, thereby performing separate reproduction or synchronous reproduction of the requested content item by the requested output unit. If the reproduction path determination notification from the reproduction path determiner 182 includes information indicating that the number of reproductions is limited, after the start of the separate reproduction processing of the content item, the reproduction controller 183 sends the number-of-reproductions manager 184 a number-of-reproductions consumption notification for decrementing the allowed number of reproductions.

When the instruction reception unit 170 receives a reproduction stop instruction for reproduction by a particular output unit, the reproduction controller 183 halts the operation of the input source selector and decoding processor included in the reproduction path of the reproduction to stop the reproduction. When the instruction reception unit 170 receives a special reproduction instruction for reproduction by a particular output unit, the reproduction controller 183 controls the input source selector and decoding processor included in the reproduction path of the reproduction to perform special reproduction.

Further, the reproduction controller 183 has a resume reproduction function that, for each output unit, at the time of stop of power supply to the reproducing device 100, saves resume information indicating the reproduction position of a content item, and after the start of power supply to the reproducing device 100, resumes reproduction of the content item from the reproduction position indicated by the resume information. For example, in a vehicle environment, power supply to the reproducing device 100 is stopped and started due to stop and start of an engine or other such events. The reproduction controller 183 saves the reproduction position of a content item at the time of stop of power supply due to engine stop or the like, and resumes reproduction of the content item from the saved reproduction position after start of power supply due to engine start or the like. Although the reproduction of the content item stops at the time of stop of power supply, the reproduction right presence/absence information of the content item is maintained 'presence'.

Further, the reproduction controller 183 has a resume reproduction function that, upon receiving a reproduction stop instruction during separate reproduction of a content item, halts the separate reproduction of the content item, saves resume information indicating the reproduction position of the content item, and then, upon receiving a reproduction instruction for the content item, resumes reproduction of the content item from the reproduction position indicated by the resume information. If the content item to which the reproduction stop instruction is directed is a limited content item, the reproduction right presence/absence information of the content item is maintained 'presence' at the time of stop of the separate reproduction of the content item.

When the reproduction controller 183 detects occurrence of a predetermined event that invalidates the reproduction right of a limited content item, it sends the number-of-reproductions manager 184 a reproduction right invalidation notification for invalidating the reproduction right of the content item. The predetermined event includes, for example, a case where the reproduction position reaches the end during separate reproduction of a content item (arrival at the end of reproduction), a case where, in a state in which a separate reproduction is stopped due to a reproduction stop instruction from a user or power supply stop and resume information is saved, a stop instruction (instruction to discard resume information) is received from a user, and a case where a reproduction instruction for another content item is received from a user (e.g., a case where reproduction of the next content item is requested by a skip operation or the like).

When the number-of-reproductions manager 184 receives a number-of-reproductions confirmation notification from the reproducibility determiner 181, it reads the allowed-number-of-reproductions information from the management information area 190 and notifies the reproducibility determiner 181 whether the allowed number of reproductions is greater than zero. When the number-of-reproductions manager 184 receives a number-of-reproductions consumption notification from the reproduction controller 183, it decrements by one the allowed number of reproductions of the limited content item reproduced in the separate reproduction by the reproduction controller 183, and updates the reproduction right presence/absence information of the content item to 'presence'. When the number-of-reproductions manager 184 receives a reproduction right invalidation notification from the reproduction controller 183, it updates the reproduction right presence/absence information stored in the management information area 190 to 'absence'.

<Operation of Reproducing Device at Start of Reproduction>

Figure 5:
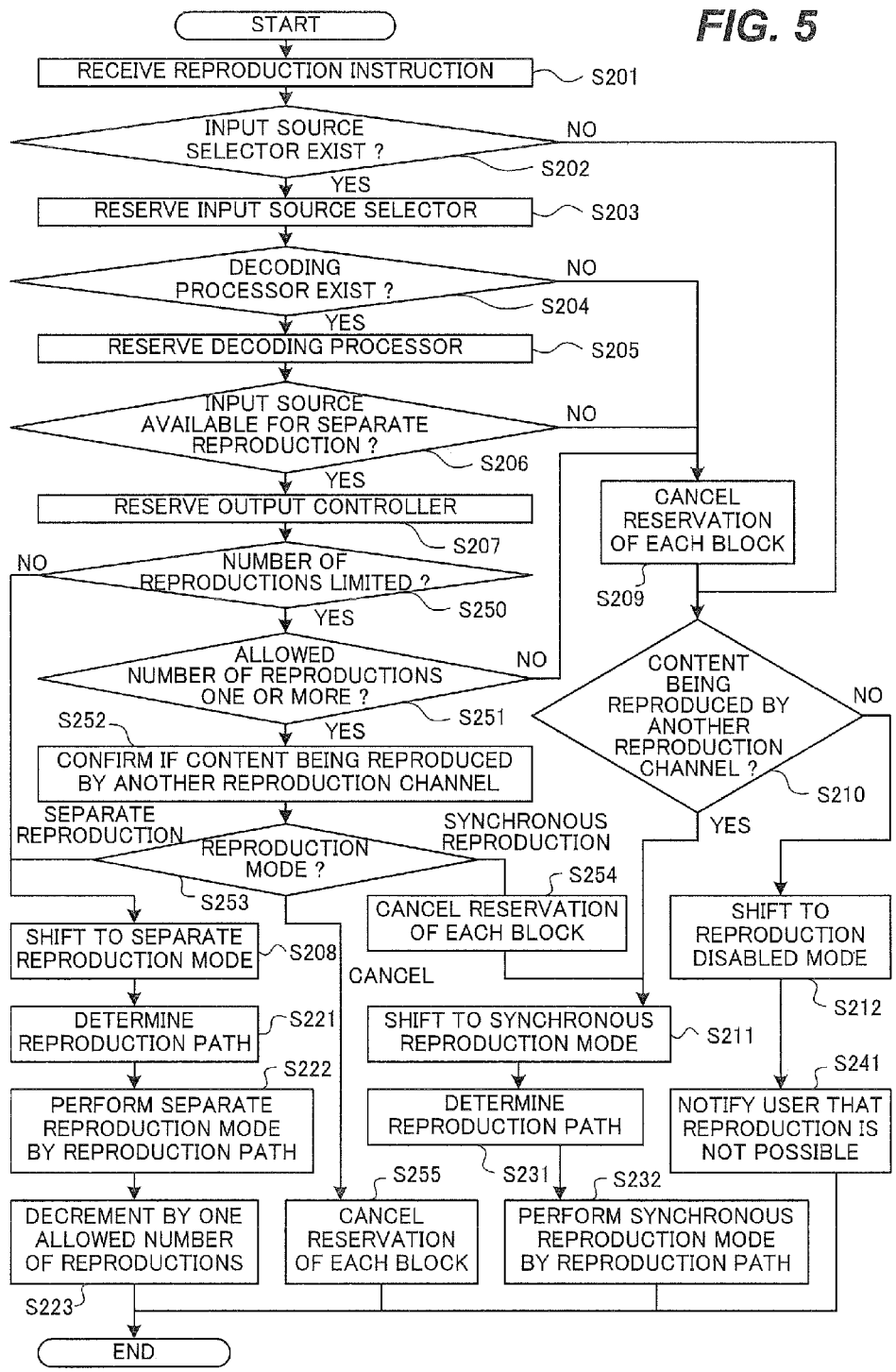
FIG. 5 is a flowchart showing an operating procedure of a control device when reproduction is started.

FIG. 5 is a flowchart illustrating an operating procedure of the control device 160 when reproduction is started. The operation of the control device 160 at the start of reproduction will be described below with reference to FIG. 5.

When the instruction reception unit 170 receives a reproduction instruction for a content item from one of the input units 151, 152, and 153 (step S201), it sends the reproduction controller 183 reproduction request information including input unit identification information identifying the input unit from which the reproduction instruction was received, input source identification information identifying the input source that is to supply the content item, and content identifying information (e.g., a file path) identifying the content item. When the reproduction controller 183 receives the reproduction request information from the instruction reception unit 170, it sends the reproduction request information to the reproducibility determiner 181 to determine whether separate reproduction or synchronous reproduction is possible.

When the reproducibility determiner 181 receives the reproduction request information from the reproduction controller 183, it checks the usage status of the input sources, input source selectors, decoding processors, and output controllers to determine whether the separate reproduction or synchronous reproduction is possible.

Specifically, when the reproducibility determiner 181 receives the reproduction request information, it checks the usage status of all the input source selectors and determines whether there is an input source selector available for use (here, an input source selector not being used for reproduction) (step S202). If there is no available input source selector (No in step S202), the reproducibility determiner 181 determines that the separate reproduction is not possible, and advances the procedure to step S210. On the other hand, if there is an available input source selector (Yes in step S202), the reproducibility determiner 181 reserves an available input source selector (step S203).

After the completion of the reservation of an input source selector, the reproducibility determiner 181 checks the usage status of all the decoding processors and determines whether there is a decoding processor available for use (here, a decoding processor not being used for reproduction) (step S204). If there is no available decoding processor (No in step S204), the reproducibility determiner 181 determines that the separate reproduction is not possible, cancels the reservation made in step S203 (step S209), and advances the procedure to step S210. On the other hand, if there is an available decoding processor (Yes in step S204), the reproducibility determiner 181 reserves an available decoding processor (step S205).

After the completion of the reservation of a decoding processor, the reproducibility determiner 181 determines whether the input source indicated by the input source identification information included in the reproduction request information is available for the separate reproduction (step S206). If the input source is being used on another reproduction channel and does not permit random access from multiple reproduction channels, the reproducibility determiner 181 determines that the input source is not available for the separate reproduction. If the input source is not being used on another reproduction channel, or if the input source permits random access from multiple reproduction channels, the reproducibility determiner 181 determines that the input source is available for the separate reproduction. Then, if the input source is not available for the separate reproduction (No in step S206), the reproducibility determiner 181 determines that the separate reproduction is not possible, cancels the reservations made in steps S203 and S205 (step S209), and advances the procedure to step S210. On the other hand, if the input source is available for the separate reproduction (Yes in step S206), the reproducibility determiner 181 determines that the separate reproduction is possible, and reserves the output controller for the output unit in the reproduction channel corresponding to the input unit indicated by the input unit identification information (i.e., the reproduction channel to which the reproduction instruction pertains) (step S207). An example of an input source that does not permit random access from multiple reproduction channels is the optical drive 12. The optical drive 12 reads data from an optical disc by moving a pickup. When multiple reproduction channels perform separate reproduction, the optical drive 12 needs to read data recorded in different areas on the optical disc, causing frequent seek operations of the pickup. In this case, the read rate or performance of the optical drive 12 lowers significantly, underflow may occur in the subsequent decoding processors, and the seek noise may interfere with listening and viewing.

After step S207, that is, after the completion of the reservations of an input source selector, a decoding processor, and an output controller, the reproducibility determiner 181 determines whether the content item indicated by the content identification information (i.e., the requested content item) is a limited content item (step S250). If the number of reproductions of the content item is not limited (No in step S250), the reproducibility determiner 181 shifts the reproduction mode to the separate reproduction mode (step S208), sends the reproduction path determiner 182 reproduction mode information indicating that the separate reproduction mode is available, and advances the procedure to step S221. On the other hand, if it is a limited content item (Yes in step S250), the reproducibility determiner 181 queries the number-of-reproductions manager 184 as to whether the allowed number of reproductions of the requested content item is one or more, and on the basis of a response from the number-of-reproductions manager 184, determines whether the separate reproduction is possible (step S251). If the reproducibility determiner 181 receives, from the number-of-reproductions manager 184, a response indicating that the allowed number of reproductions is less than one, it determines that the separate reproduction is not possible (No in step S251), cancels the reservations made in steps S203, S205, and S207 (step S209), and advances the procedure to step S210. On the other hand, if the reproducibility determiner 181 receives a response indicating that the allowed number of reproductions is one or more, it determines that the separate reproduction is possible (Yes in step S251), and confirms whether the requested content item is a content item being reproduced on another reproduction channel (step S252). Then, in accordance with the result of the confirmation, the reproducibility determiner 181 causes the requested output unit to display a reproduction confirmation screen that prompts a user to select a reproduction mode for the reproduction, receives an instruction from a user on the reproduction confirmation screen, and determines the reproduction mode on the basis of the instruction (step S253). Specifically, if the result of the confirmation in step S252 indicates that the requested content item is not a content item being reproduced on another reproduction channel, the reproducibility determiner 181 displays the reproduction confirmation screen of FIG. 2, and receives from a user a selection of one of the separate reproduction mode and cancellation of reproduction (cancel reproduction). On the other hand, if the requested content item is a content item being reproduced on another reproduction channel, the reproducibility determiner 181 displays the reproduction confirmation screen of FIG. 3, and receives from a user a selection of one of the separate reproduction mode, synchronous reproduction mode, and cancellation of reproduction (cancel reproduction).

If the separate reproduction mode is selected (separate reproduction in step S253), the reproducibility determiner 181 shifts the reproduction mode to the separate reproduction mode (step S208), sends the reproduction path determiner 182 reproduction mode information indicating that the separate reproduction mode is available, and advances the procedure to step S221. The reproduction mode information here includes information indicating that the number of reproductions is limited.

If the synchronous reproduction mode is selected (synchronous reproduction in step S253), the reproducibility determiner 181 cancels the reservations made in steps S203, S205, and S207 (step S254), then shifts the reproduction mode to the synchronous reproduction mode (step S211), sends the reproduction path determiner 182 reproduction mode information indicating that the synchronous reproduction mode is available, and advances the procedure to step S231.

If cancellation of reproduction is selected (cancellation of reproduction in step S253), the reproducibility determiner 181 cancels the reservations made in steps S203, S205, and S207 (step S255), and ends the procedure without reproducing the requested content item.

In step S210, the reproducibility determiner 181 determines whether the content item indicated by the content identification information (i.e. the requested content item) is a content item being reproduced on another reproduction channel.

If the requested content item is a content item being reproduced (Yes in step S210), the reproducibility determiner 181 determines that the synchronous reproduction is possible, shifts the reproduction mode to the synchronous reproduction mode (step S211), sends the reproduction path determiner 182 reproduction mode information indicating that the synchronous reproduction mode is available, and advances the procedure to step S231.

On the other hand, if the requested content item is not a content item being reproduced (No in step S210), the reproducibility determiner 181 determines that the reproduction is not possible, shifts the reproduction mode to a reproduction disabled mode (step S212), notifies the reproduction controller 183 that the reproduction is not possible, and advances the procedure to step S241.

In step S221, when the reproduction path determiner 182 receives the reproduction mode information indicating that the separate reproduction mode is available, determines the reproduction path of the reproduction channel to which the reproduction instruction pertains. Specifically, the reproduction path determiner 182 has a resource management information table (e.g., see FIG. 7) for managing the usage resources (or the reproduction path) of each reproduction channel, and upon receiving the reproduction mode information, enters the input source selector reserved in step S203, the decoding processor reserved in step S205, and the output controller reserved in step S207 in the resource management information table as usage resources of the reproduction channel to which the reproduction instruction pertains. For example, the reproduction path determiner 182 receives, from the reproducibility determiner 181, along with the reproduction mode information, information indicating the reserved input source selector, decoding processor, and output controller, and records this information in the resource management information table as resource management information for the reproduction channel to which the reproduction instruction pertains. After determining the reproduction path, the reproduction path determiner 182 sends the reproduction controller 183 a reproduction path determination notification, and advances the procedure to step S222. At this time, if the reproduction mode information from the reproducibility determiner 181 includes information indicating that the number of reproductions is limited, the reproduction path determiner 182 includes, in the reproduction path determination notification, information indicating that the number of reproductions is limited.

In step S222, the reproduction controller 183 uses the input source selector, decoding processor, and output controller on the reproduction path determined in step S221 to perform the separate reproduction of the requested content item by the output unit to which the reproduction instruction pertains. Here, upon receiving the reproduction path determination notification from the reproduction path determiner 182, the reproduction controller 183 requests the resource management information of the reproduction channel to which the reproduction instruction pertains from the reproduction path determiner 182. Then, on the basis of the obtained resource management information, the reproduction controller 183 sets the resources of the reproduction channel to which the reproduction instruction pertains to perform the separate reproduction of the requested content item. Specifically, the reproduction controller 183 sets the decoding processor in the reproduction channel to which the reproduction instruction pertains as the output destination of the input source selector in the reproduction channel, and sets the output controller in the reproduction channel as the output destination of the decoding processor in the reproduction channel. The reproduction controller 183 also sets the input source identification information and content identification information included in the reproduction request information in the input source selector in the reproduction channel. With these settings, the input source selector in the reproduction channel obtains the content item indicated by the content identification information from the input source indicated by the input source identification information via the input device selector 101, and outputs it to the decoding processor in the reproduction channel. The decoding processor decodes the content item from the input source selector to output the obtained video-audio signal to the output controller in the reproduction channel. The output controller superimposes a video signal obtained by conversion of graphic data generated by the control device 160 on the video signal from the decoding processor, and outputs the obtained video signal to the monitor in the reproduction channel to which the reproduction instruction pertains. The output controller also outputs the audio signal from the decoding processor to the speaker in the reproduction channel to which the reproduction instruction pertains. When an operational sound is output in response to a user operation, the output controller superimposes the operational sound (e.g., a button sound) on the audio signal from the decoding processor, and outputs the obtained audio signal to the speaker.

In step S223, if the reproduction path determination notification from the reproduction path determiner 182 includes the information indicating that the number of reproductions is limited, that is, if separate reproduction of a content item having a limited number of reproductions is performed, at the start of reproduction processing of the content item, the reproduction controller 183 sends the number-of-reproductions manager 184 a number-of-reproductions consumption notification. When the number-of-reproductions manager 184 receives the number-of-reproductions consumption notification from the reproduction controller 183, it decrements by one the allowed number of reproductions of the content item for which the separate reproduction is performed, and updates the reproduction right presence/absence information of the content item to 'presence'.

In step S231, upon receiving the reproduction mode information indicating that the synchronous reproduction mode is available, the reproduction path determiner 182 determines the reproduction path of the reproduction channel to which the reproduction instruction pertains. Specifically, upon receiving the reproduction mode information, the reproduction path determiner 182 enters the input source selector and decoding processor being used on another reproduction channel that is reproducing the content item to which the reproduction instruction pertains, and the output controller for the output unit in the reproduction channel to which the reproduction instruction pertains, in the resource management information table as usage resources of the reproduction channel to which the reproduction instruction pertains. For example, the reproduction path determiner 182 receives, from the reproducibility determiner 181, along with the reproduction mode information, information indicating another reproduction channel that is reproducing the content item to which the reproduction instruction pertains, and on the basis of this information, performs the above process. After determining the reproduction path, the reproduction path determiner 182 sends the reproduction controller 183 a reproduction path determination notification, and advances the procedure to step S232.

In step S232, the reproduction controller 183 uses the input source selector, decoding processor, and output controller on the reproduction path determined in step S231 to perform the synchronous reproduction of the requested content item by the output unit to which the reproduction instruction pertains. Here, upon receiving the reproduction path determination notification from the reproduction path determiner 182, the reproduction controller 183 requests the resource management information for the reproduction channel to which the reproduction instruction pertains from the reproduction path determiner 182. Then, on the basis of the obtained resource management information, the reproduction controller 183 sets the resources of the reproduction channel to which the reproduction instruction pertains to perform the synchronous reproduction of the requested content item. Specifically, the reproduction controller 183 sets the output controller in the reproduction channel to which the reproduction instruction pertains as an additional output destination of the decoding processor in the reproduction channel. With this setting, the decoding processor in the reproduction channel to which the reproduction instruction pertains outputs the decoded video-audio signal to the output controller in the reproduction channel to which the reproduction instruction pertains as well as the output controller in the other reproduction channel. The output controller superimposes a video signal obtained by conversion of graphic data generated by the control device 160 on the video signal from the decoding processor, and outputs the obtained video signal to the monitor in the reproduction channel to which the reproduction instruction pertains. The output controller also outputs the audio signal from the decoding processor to the speaker in the reproduction channel to which the reproduction instruction pertains. When an operational sound is output in response to a user operation, the output controller superimposes the operational sound (e.g., a button sound) on the audio signal from the decoding processor, and outputs the obtained audio signal to the speaker.

In step S241, when the reproduction controller 183 receives the notification indicating that the reproduction is not possible from the reproducibility determiner 181, it notifies the user that the reproduction is not possible. For example, the reproduction controller 183 causes, via the output controller in the reproduction channel to which the reproduction instruction pertains, the output unit in the reproduction channel to which the reproduction instruction pertains to output a message indicating that the reproduction is not possible or an error sound. The message is displayed on a graphics screen such as a graphic user interface, for example.

The above procedure is an example and may be appropriately changed. For example, in the above description, the determination based on the allowed number of reproductions as to whether reproduction is possible is made in step S251, but the determination based on the allowed number of reproductions as to whether reproduction is possible may be made in step S222, or between step S201 and S202.

<Operation of Reproducing Device in Stopping Reproduction>

Figure 6:
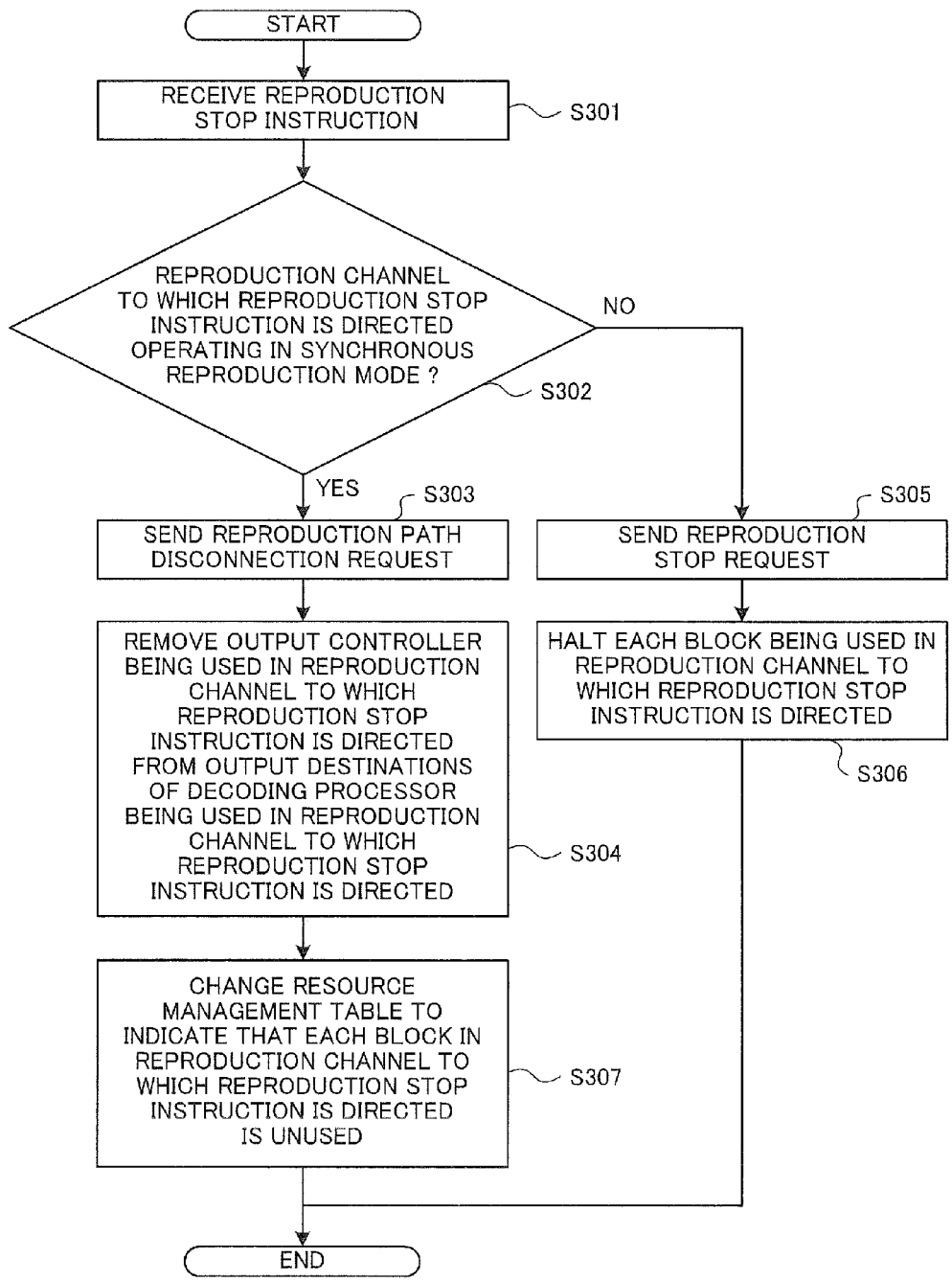
FIG. 6 is a flowchart showing an operating procedure of the control device when reproduction is stopped.

FIG. 6 is a flowchart illustrating an operating procedure of the control device 160 when reproduction is stopped. The operation of the control device 160 in stopping reproduction will be described below with reference to FIG. 6.

When the instruction reception unit 170 receives a reproduction stop instruction from one of the input units 151, 152, and 153 (step S301), it sends the reproduction controller 183 reproduction stop request information including input unit identification information identifying the input unit from which the reproduction stop instruction was received. When the reproduction controller 183 receives the reproduction stop request information, it sends the reproduction stop request information to the reproducibility determiner 181.

When the reproducibility determiner 181 receives the reproduction stop request information from the reproduction controller 183, it determines whether the input source selector and decoding processor being used in the reproduction channel corresponding to the input unit indicated by the input unit identification information (i.e., the reproduction channel to which the reproduction stop instruction pertains) is being used in another reproduction channel, that is, whether the reproduction channel to which the reproduction stop instruction pertains is in the synchronous reproduction mode (step S302).

If it is determined in step S302 that it is in the synchronous reproduction mode (Yes in step S302), the reproducibility determiner 181 sends a reproduction path disconnection request to the reproduction path determiner 182 (step S303). The reproduction path disconnection request is a request to remove the output controller used in the reproduction channel to which the reproduction stop instruction pertains from the output destinations of the decoding processor used in the reproduction channel, that is, a request to delete the path from the decoding processor to the output controller.

When the reproduction path determiner 182 receives the reproduction path disconnection request from the reproducibility determiner 181, it sends a reproduction path disconnection request to the reproduction controller 183 in order to remove the output controller used in the reproduction channel to which the reproduction stop instruction pertains from the output destinations of the decoding processor used in the reproduction channel.

When the reproduction controller 183 receives the reproduction path disconnection request, it removes the output controller being used in the reproduction channel to which the reproduction stop instruction pertains from the output destinations of the decoding processor being used in the reproduction channel to which the reproduction stop instruction pertains (step S304). The reproduction controller 183 then sends the reproduction path determiner 182 a reproduction path disconnection response notification, and advances the procedure to step S307.

On the other hand, if it is determined in step S302 that it is not in the synchronous reproduction mode (No in step S302), the reproducibility determiner 181 sends the reproduction path determiner 182 a reproduction stop request (step S305). This reproduction stop request is a request to halt the input source selector and decoding processor being used in the reproduction channel to which the reproduction stop instruction pertains and set the resource management information of the reproduction channel to which the reproduction stop instruction pertains to indicate 'unused'.

When the reproduction path determiner 182 receives the reproduction stop request from the reproducibility determiner 181, it sends the reproduction controller 183 a reproduction stop request in order to halt the input source selector and decoding processor being used in the reproduction channel to which the reproduction stop instruction pertains.

When the reproduction controller 183 receives the reproduction stop request, it halts the input source selector and decoding processor being used in the reproduction channel to which the reproduction stop instruction pertains (step S306). At this time, the reproduction controller 183 may perform a process to invalidate the settings of the output destinations of each of the input source selector and decoding processor. After the above halting process, the reproduction controller 183 sends the reproduction path determiner 182 a reproduction stop response notification and advances the procedure to step S307.

In step S307, when the reproduction path determiner 182 receives the reproduction path disconnection response notification or reproduction stop response notification, it updates the resource management information table to indicate that the input source selector, decoding processor, and output controller in the reproduction channel to which the reproduction stop instruction pertains are not in use.

<Specific Examples of Operation of Reproducing Device>

The operation of the reproducing device 100 in specific first to eleventh cases will be described below. The first to eleventh cases are assumed to occur in order.

<First Case>

A case will be described where, in a state in which no reproduction is performed on any of the reproduction channels, a user (referred to below as the 'first user') who uses the first output unit 141 gives an instruction to reproduce a content item C1, which is a moving picture file stored in the memory device 13, on the first reproduction channel. The content item C1 is an unlimited content item.

The first user selects, via the first input unit 151, the content item C1 to be reproduced from a reproduction list, which is a list of files stored in the memory device 13 and is displayed on the first monitor 141$m$, and gives the reproducing device 100 an instruction to reproduce the content item C1.

When the instruction reception unit 170 in the reproducing device 100 receives the reproduction instruction from the first user from the first input unit 151, it sends the reproduction controller 183 reproduction request information including input unit identification information indicating the first input unit 151, input source identification information indicating the memory device 13, and content identification information indicating the content item C1.

When the reproduction controller 183 receives the reproduction request information, it sends the reproduction request information to the reproducibility determiner 181.

When the reproducibility determiner 181 receives the reproduction request information, it determines whether there is an available input source selector. In the present case, the reproducibility determiner 181 determines that there is an available input source selector, and reserves an available input source selector as the input source selector for the first reproduction channel. Here, it will be assumed that the first input source selector 111 is reserved.

After the completion of the reservation of the input source selector, the reproducibility determiner 181 determines whether there is an available decoding processor. In the present case, the reproducibility determiner 181 determines that there is an available decoding processor, and reserves an available decoding processor as the decoding processor for the first reproduction channel. Here, it will be assumed that the first decoding processor 121 is reserved.

After the completion of the reservation of the decoding processor, the reproducibility determiner 181 determines whether the input source indicated by the input source identification information is an input device available for separate reproduction. In the present case, since the memory device 13 is not being used for reproduction and permits random access from multiple reproduction channels, the reproducibility determiner 181 determines that the memory device 13 is an input device available for separate reproduction, and reserves the first output controller 131 as the output controller for the first reproduction channel.

After the completion of the reservation of the output controller, since the number of reproductions of the content item C1 is not limited, the reproducibility determiner 181 shifts the reproduction mode to the separate reproduction mode, and sends the reproduction path determiner 182 reproduction mode information indicating that the separate reproduction mode is available.

On the basis of the reproduction mode information sent from the reproducibility determiner 181, the reproduction path determiner 182 determines a path including the reserved first input source selector 111, first decoding processor 121, and first output controller 131 as the reproduction path of the first reproduction channel. The reproduction path determiner 182 records the first input source selector 111, first decoding processor 121, and first output controller 131 as resources of the first reproduction channel in the resource management information table. FIG. 7 shows the resource management information table 400 after the recording. The resource management information table 400 includes resource management information 401 for the first reproduction channel determined this time. In this resource management information 401, the first input source selector, first decoding processor, and first output controller are recorded as the input source selector, decoding processor, and output controller to be used in the first reproduction channel. The reproduction path determiner 182 sends a reproduction path determination notification to the reproduction controller 183.

When the reproduction controller 183 receives the reproduction path determination notification from the reproduction path determiner 182, it requests the resource management information for the first reproduction channel from the reproduction path determiner 182. On the basis of the obtained resource management information, the reproduction controller 183 sets the first decoding processor 121 as an output destination of the first input source selector 111, and sets the first output controller 131 as an output destination of the first decoding processor 121. Next, the reproduction controller 183 sets the input source identification information and content identification information included in the reproduction request information to the first input source selector 111.

With the above settings, on the basis of the input source identification information and content identification information, the first input source selector 111 requests, via the input device selector 101, the memory device 13 to read the video-audio data of the content item C1, demultiplexes the video-audio data read via the input device selector 101 into video stream data, audio stream data, and other stream data for a caption or the like, and outputs them to the first decoding processor 121. The first decoding processor 121 decodes the various stream data, and outputs the obtained video-audio signal to the first output controller 131.

The first output controller 131 superimposes a predetermined video signal on the video signal from the first decoding processor 121 to output the obtained video signal to the first monitor 141$m$. The first output controller 131 also outputs the audio signal from the first decoding processor 121 to the first speaker 141$s$. When an operational sound is output, the first output controller 131 superimposes the operational sound on the audio signal from the first decoding processor 121 to output the obtained audio signal to the first speaker 141$s$.

<Second Case>

A case will be described where, following the first case, a user (referred to below as the 'second user') who uses the second output unit 142 gives an instruction to reproduce a content item C2, which is a moving picture file stored in the optical drive 12, on the second reproduction channel. The content item C2 is a limited content item, and its allowed number of reproductions is '1'. The content item C2 is a content item that has never been reproduced, and its reproduction right presence/absence information is 'absence'.

The second user selects, via the second input unit 152, the content item C2 to be reproduced from a reproduction list, which is a list of files stored in the optical disc (not shown) inserted in the optical drive 12 and is displayed on the second monitor 142$m$, and gives the reproducing device 100 an instruction to reproduce the content item C2.

When the instruction reception unit 170 in the reproducing device 100 receives the reproduction instruction from the second user from the second input unit 152, it sends the reproduction controller 183 reproduction request information including input unit identification information indicating the second input unit 152, input source identification information indicating the optical drive 12, and content identification information indicating the content item C2.

When the reproduction controller 183 receives the reproduction request information, it sends the reproduction request information to the reproducibility determiner 181.

When the reproducibility determiner 181 receives the reproduction request information, it determines whether there is an available input source selector. In the present case, the reproducibility determiner 181 determines that there is an available input source selector, and reserves the second input source selector 112, which is an available input source selector, as the input source selector for the second reproduction channel.

After the completion of the reservation of the input source selector, the reproducibility determiner 181 determines whether there is an available decoding processor. In the present case, the reproducibility determiner 181 determines that there is an available decoding processor, and reserves the second decoding processor 122, which is an available decoding processor, as the decoding processor for the second reproduction channel.

After the completion of the reservation of the decoding processor, the reproducibility determiner 181 determines whether the input source indicated by the input source identification information is an input device available for separate reproduction. In the present case, although the optical drive 12, which does not permit random access from multiple reproduction channels, is selected, since the optical drive 12 is not being used on another reproduction channel, the reproducibility determiner 181 determines that the optical drive 12 is an input device available for separate reproduction, and reserves the second output controller 132 as the output controller for the second reproduction channel.

After the completion of the reservation of the output controller, the reproducibility determiner 181 determines that the number of reproductions of the content item C2 is limited, the allowed number of reproductions of the content item C2 is one or greater, and the content item C2 is not being reproduced on another reproduction channel. The reproducibility determiner 181 then requests the control device 160 to display the reproduction confirmation screen (FIG. 2) in order to confirm whether to consume the allowed number of reproductions. The control device 160 displays the reproduction confirmation screen (FIG. 2) on the second monitor 142m, receives a selection of a reproduction mode from the user, and notifies the reproducibility determiner 181 as to which reproduction mode has been selected by the user. Here, it will be assumed that the separate reproduction mode has been selected by the user. The reproducibility determiner 181 shifts the reproduction mode to the separate reproduction mode, and sends the reproduction path determiner 182 reproduction mode information indicating that the separate reproduction mode is available. This reproduction mode information includes information indicating that the number of reproductions is limited.

On the basis of the reproduction mode information sent from the reproducibility determiner 181, the reproduction path determiner 182 determines a path including the reserved second input source selector 112, second decoding processor 122, and second output controller 132 as the reproduction path of the second reproduction channel. The reproduction path determiner 182 records the second input source selector 112, second decoding processor 122, and second output controller 132 as resources of the second reproduction channel in the resource management information table. FIG. 8 shows the resource management information table 500 after the recording. The resource management information table 500 includes resource management information 501 for the second reproduction channel determined this time. In this resource management information 501, the second input source selector, second decoding processor, and second output controller are recorded as the input source selector, decoding processor, and output controller to be used in the second reproduction channel. The reproduction path determiner 182 sends a reproduction path determination notification to the reproduction controller 183. This reproduction path determination notification includes information indicating that the number of reproductions is limited.

When the reproduction controller 183 receives the reproduction path determination notification from the reproduction path determiner 182, it requests the resource management information for the second reproduction channel from the reproduction path determiner 182. On the basis of the obtained resource management information, the reproduction controller 183 sets the second decoding processor 122 as an output destination of the second input source selector 112, and sets the second output controller 132 as an output destination of the second decoding processor 122. Next, the reproduction controller 183 sets the input source identification information and content identification information included in the reproduction request information to the second input source selector 112.

With the above settings, on the basis of the input source identification information and content identification information, the second input source selector 112 requests, via the input device selector 101, the optical drive 12 to read the video-audio data of the content item C2, demultiplexes the video-audio data read via the input device selector 101 into video stream data, audio stream data, and other stream data for a caption or the like, and outputs them to the second decoding processor 122. The second decoding processor 122 decodes the various stream data, and outputs the obtained video-audio signal to the second output controller 132.

The second output controller 132 superimposes a predetermined video signal on the video signal from the second decoding processor 122 to output the obtained video signal to the second monitor 142m. The second output controller 132 also outputs the audio signal from the second decoding processor 122 to the second speaker 142s. When an operational sound is output, the second output controller 132 superimposes the operational sound on the audio signal from the second decoding processor 122 to output the obtained audio signal to the second speaker 142s.

Since the reproduction path determination notification includes the information indicating that the number of reproductions is limited, when the reproduction controller 183 detects the start of decoding of the content item C2, it sends a number-of-reproductions consumption notification to the number-of-reproductions manager 184. Upon receiving the number-of-reproductions consumption notification, the number-of-reproductions manager 184 decrements by one the allowed number of reproductions of the content item C2, thereby making it '0', and updates the reproduction right presence/absence information of the content item C2 to 'presence'.

<Third Case>

A case will be described where, following the second case, a user (referred to below as the 'third user') who uses the third output unit 143 gives an instruction to reproduce a content item C2, which is a moving picture file that is stored in the optical drive 12 and is being viewed by the second user, on the third reproduction channel. The content item C2 is a limited content item, its allowed number of reproductions is '0', and its reproduction right presence/absence information is 'presence'.

The third user selects, via the third input unit 153, the content item C2 from a reproduction list, which is a list of files stored in the optical disc (not shown) inserted in the optical drive 12 and is displayed on the third monitor 143m, and gives the reproducing device 100 an instruction to reproduce the content item C2.

When the instruction reception unit 170 in the reproducing device 100 receives the reproduction instruction from the third user from the third input unit 153, it sends the reproduction controller 183 reproduction request information including input unit identification information indicating the third input unit 153, input source identification information indicating the optical drive 12, and content identification information indicating the content item C2.

When the reproduction controller 183 receives the reproduction request information, it sends the reproduction request information to the reproducibility determiner 181.

When the reproducibility determiner 181 receives the reproduction request information, it determines whether there is an available input source selector. In the present case, the reproducibility determiner 181 determines that there is no available input source selector, and determines that the separate reproduction is not possible. The reproducibility determiner 181 then determines whether the requested content item C2 is being reproduced on another reproduction channel. In the present case, the reproducibility determiner 181 determines that the content item C2 is being reproduced on another reproduction channel, determines that the synchronous reproduction is possible, shifts the reproduction mode to the synchronous reproduction mode, and sends the reproduction path determiner 182 reproduction mode information indicating that the synchronous reproduction mode is available.

Figure 9:
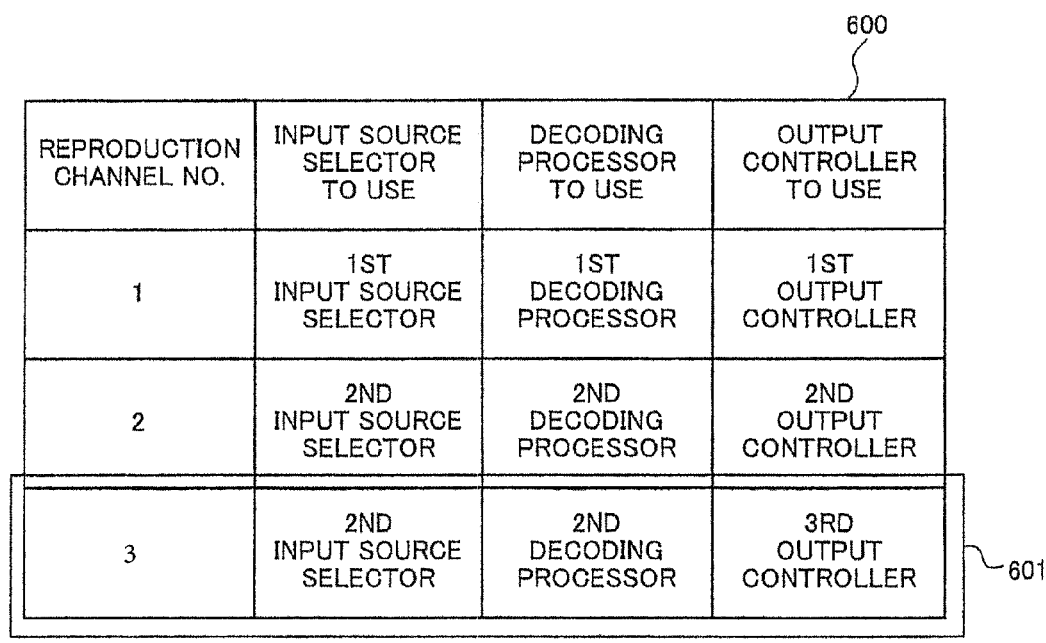
FIG. 9 is a drawing showing the resource management information table after recording in a third case.

On the basis of the reproduction mode information sent from the reproducibility determiner 181, the reproduction path determiner 182 refers to the resource management information table and determines, as the reproduction path of the third reproduction channel, a path including the second input source selector 112 and second decoding processor 122 being used on the second reproduction channel, which is reproducing the content item C2, and third output controller 133 corresponding to the third reproduction channel. The reproduction path determiner 182 then records the second input source selector 112, second decoding processor 122, and third output controller 133 as resources of the third reproduction channel in the resource management information table. FIG. 9 shows the resource management information table 600 after the recording. The resource management information table 600 includes resource management information 601 for the third reproduction channel determined this time. In this resource management information 601, the second input source selector, second decoding processor, and third output controller are recorded as the input source selector, decoding processor, and output controller to be used in the third reproduction channel. The reproduction path determiner 182 sends a reproduction path determination notification to the reproduction controller 183.

When the reproduction controller 183 receives the reproduction path determination notification from the reproduction path determiner 182, it requests the resource management information for the third reproduction channel from the reproduction path determiner 182. On the basis of the obtained resource management information, the reproduction controller 183 sets the third output controller 133 as an additional output destination of the second decoding processor 122.

With the above setting, the second decoding processor 122 outputs a decoded video-audio signal to the second output controller 132 and third output controller 133.

The third output controller 133 superimposes a predetermined video signal on the video signal from the second decoding processor 122 to output the obtained video signal to the third monitor 143m. The third output controller 133 also outputs the audio signal from the second decoding processor 122 to the third speaker 143s. When an operational sound is output, the third output controller 133 superimposes the operational sound on the audio signal from the second decoding processor 122 to output the obtained audio signal to the third speaker 143s.

When the synchronous reproduction starts on the third reproduction channel as described above, the second and third reproduction channels share the second input source selector 112 and second decoding processor 122, and reproduce and output the same video-audio signal, so the reproduction mode of the second reproduction channel also shifts from the separate reproduction mode to the synchronous reproduction mode.

<Fourth Case>

A case will be described where, following the third case, the second user gives an instruction to reproduce a content item C3, which is a moving picture file that is stored in the memory device 13 and is not being reproduced on another reproduction channel, on the second reproduction channel.

The second user selects, via the second input unit 152, the content item C3 from a reproduction list, which is a list of files stored in the memory device 13 and is displayed on the second monitor 142m, and gives the reproducing device 100 an instruction to reproduce the content item C3.

When the instruction reception unit 170 in the reproducing device 100 receives the reproduction instruction from the second user, it sends reproduction request information to the reproduction controller 183, which sends the reproduction request information to the reproducibility determiner 181.

When the reproducibility determiner 181 receives the reproduction request information, it determines whether there is an available input source selector. In the present case, the reproducibility determiner 181 determines that there is no available input source selector, and determines that the separate reproduction is not possible. The reproducibility determiner 181 then determines whether the requested content item C3 is being reproduced on another reproduction channel. In the present case, the reproducibility determiner 181 determines that the content item C3 is not being reproduced on another reproduction channel, determines that the reproduction is not possible, shifts the reproduction mode to the reproduction disabled mode, and notifies the reproduction controller 183 that the reproduction is not possible. The reproduction controller 183 causes, via the second output controller 132, the second output unit 142 to output a message indicating that the reproduction is not possible or an error sound.

<Fifth Case>

A case will be described where, following the fourth case, the second user gives an instruction to stop the reproduction from the optical drive 12 on the second reproduction channel. That is, a case will be described where, in a state in which the second and third reproduction channels are performing the synchronous reproduction of the same content item, a request is made to stop reproduction on one of the two reproduction channels.

In order to stop the reproduction of the content item C2 being viewed, the second user gives, via the second input unit 152, the reproducing device 100 an instruction to stop reproduction.

When the instruction reception unit 170 in the reproducing device 100 receives the reproduction stop instruction from the second user from the second input unit 152, it sends the reproduction controller 183 reproduction stop request information including input unit identification information indicating the second input unit 152, which received the reproduction stop instruction.

When the reproduction controller 183 receives the reproduction stop request information, it sends the reproduction stop request information to the reproducibility determiner 181.

When the reproducibility determiner 181 receives the reproduction stop request information from the reproduction controller 183, it determines whether the second input source selector 112 and second decoding processor 122 being used on the second reproduction channel are being used on another reproduction channel, that is, whether the second reproduction channel is in the synchronous reproduction mode. In the present case, since the second reproduction channel is operating in the synchronous reproduction mode with the third reproduction channel, the reproducibility determiner 181 determines that it is in the synchronous reproduction mode, and sends a reproduction path disconnection request to the reproduction path determiner 182.

When the reproduction path determiner 182 receives the reproduction path disconnection request from the reproducibility determiner 181, it sends a reproduction path disconnection request to the reproduction controller 183.

When the reproduction controller 183 receives the reproduction path disconnection request, it changes the settings of the second decoding processor 122 so that the output destinations of the second decoding processor 122 is changed from the second output controller 132 and third output controller 133 to only the third output controller 133. The reproduction controller 183 then sends a reproduction path disconnection response notification to the reproduction path determiner 182.

Figure 10:
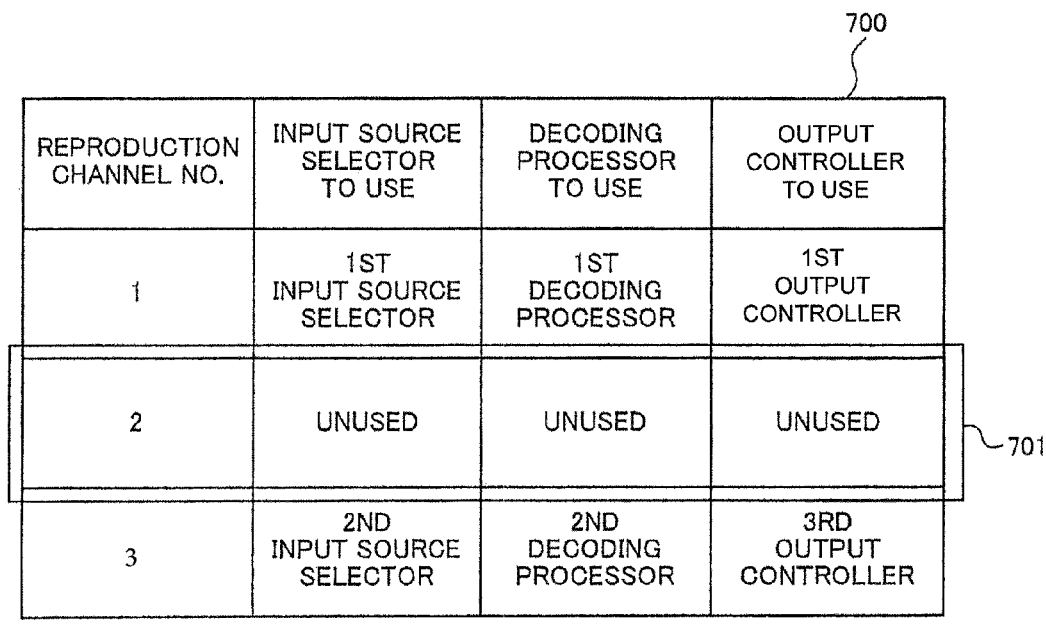
FIG. 10 is a drawing showing the resource management information table after recording in a fifth case.

When the reproduction path determiner 182 receives the reproduction path disconnection response notification, it changes the resource management information table to indicate that no input source selector, decoding processor, or output controller is being used in the second reproduction channel. FIG. 10 shows the resource management information table 700 after the change. The resource management information table 700 includes resource management information 701 for the second reproduction channel changed this time. The changed resource management information 701 indicates that no input source selector, decoding processor, or output controller is being used in the second reproduction channel.

Due to the stop of the reproduction on the second reproduction channel, the mode of the third reproduction channel shifts from the synchronous reproduction mode to the separate reproduction mode. As such, in a state where the synchronous reproduction of the same content item on multiple reproduction channels is being performed, when an instruction to stop reproduction on one reproduction channel is given, reproduction only on that reproduction channel is stopped, and reproduction continues on the other one or more reproduction channels. At this time, if the number of the other one or more reproduction channels is only one, the reproduction mode of the other reproduction channel shifts from the synchronous reproduction mode to the separate reproduction mode.

<Sixth Case>

A case will be described where, following the fifth case, after the reproductions on the first and third reproduction channels have been stopped, resulting in a state in which none of the reproduction channels perform reproduction, the user (second user) who uses the second output unit 142 gives an instruction to reproduce a content item C4, which is a moving picture file stored in the memory device 13, on the second reproduction channel. The content item C4 is a limited content item, and its allowed number of reproductions is '2'. The content item C4 has never been reproduced, and its reproduction right presence/absence information is 'absence'.

The second user gives, via the second input unit 152, the reproducing device 100 an instruction to reproduce the content item C4.

In response to the reproduction instruction from the second user, the reproducibility determiner 181 reserves the second input source selector 112 as the input source selector for the second reproduction channel, reserves the second decoding processor 122 as the decoding processor for the second reproduction channel, and reserves the second output controller 132 as the output controller for the second reproduction channel.

After the completion of the reservation of the output controller, the reproducibility determiner 181 determines that the content item C4 is a limited content item, the allowed number of reproductions of the content item C4 is one or greater, and the content item C4 is not being reproduced on another reproduction channel. The reproducibility determiner 181 then requests the reproduction controller 183 to display the reproduction confirmation screen (FIG. 2). The reproduction controller 183 displays the reproduction confirmation screen (FIG. 2) on the second monitor 142m, receives a selection of a reproduction mode from the user, and notifies the reproducibility determiner 181 as to which reproduction mode has been selected by the user. Here, the user selects the separate reproduction mode; the reproducibility determiner 181 shifts the reproduction mode to the separate reproduction mode, and sends the reproduction path determiner 182 reproduction mode information indicating that the separate reproduction mode is available. This reproduction mode information includes information indicating that the number of reproductions is limited.

On the basis of the reproduction mode information sent from the reproducibility determiner 181, the reproduction path determiner 182 determines a path including the reserved second input source selector 112, second decoding processor 122, and second output controller 132 as the reproduction path of the second reproduction channel. The reproduction path determiner 182 then sends the reproduction controller 183 a reproduction path determination notification, which includes information indicating that the number of reproductions is limited.

When the reproduction controller 183 receives the reproduction path determination notification from the reproduction path determiner 182, it sets the second decoding processor 122 as an output destination of the second input source selector 112, and sets the second output controller 132 as an output destination of the second decoding processor 122. Next, the reproduction controller 183 sets identification information of the memory device 13 and identification information of the content item C4 to the second input source selector 112.

With the above settings, the second input source selector 112 requests, via the input device selector 101, the memory device 13 to read the video-audio data of the content item C4, demultiplexes the video-audio data read via the input device selector 101 into video stream data, audio stream data, and other stream data for a caption or the like, and outputs them to the second decoding processor 122. The second decoding processor 122 decodes the above various stream data, and outputs the obtained video-audio signal to the second output controller 132.

The second output controller 132 outputs the video signal and audio signal from the second decoding processor 122 to the second monitor 142m and second speaker 142s, respectively.

Since the reproduction path determination notification includes the information indicating that the number of reproductions is limited, when the reproduction controller 183 detects the start of decoding of the content item C4, it sends the number-of-reproductions manager 184 a number-of-reproductions consumption notification. When the number-of-reproductions manager 184 receives the number-of-reproductions consumption notification, it decrements by one the allowed number of reproductions of the content item C4, thereby making it '1', and updates the reproduction right presence/absence information of the content item C4 to 'presence'.

<Seventh Case>

A case will be described where, following the sixth case, the user (third user) who uses the third output unit 143 gives an instruction to reproduce the content item C4, which is a moving video file that is stored in the memory device 13 and is being viewed by the second user, on the third reproduction channel. The content item C4 is a limited content item, its allowed number of reproductions is '1', and its reproduction right presence/absence information is 'presence'.

The third user gives, via the third input unit 153, the reproducing device 100 an instruction to reproduce the content item C4. In response to this reproduction instruction from the third user, the reproducibility determiner 181 reserves the first input source selector 111, first decoding processor 121, and third output controller 133.

After the completion of the reservation of the output controller, the reproducibility determiner 181 determines that the content item C4 is a limited content item, the allowed number of reproductions of the content item C4 is one or greater, and the content item C4 is being reproduced on another reproduction channel. The reproducibility determiner 181 then requests the reproduction controller 183 to display the reproduction confirmation screen (FIG. 3). The reproduction controller 183 displays the reproduction confirmation screen (FIG. 3) on the third monitor 143m, receives a selection of a reproduction mode from the user, and notifies the reproducibility determiner 181 as to which reproduction mode has been selected by the user. Here, the user selects the separate reproduction mode; the reproducibility determiner 181 shifts the reproduction mode to the separate reproduction mode, and sends the reproduction path determiner 182 reproduction mode information indicating that the separate reproduction mode is available. This reproduction mode information includes information indicating that the number of reproductions is limited.

On the basis of the reproduction mode information from the reproducibility determiner 181, the reproduction path determiner 182 determines a path including the reserved first input source selector 111, first decoding processor 121, and third output controller 133 as the reproduction path of the third reproduction channel. The reproduction path determiner 182 then sends the reproduction controller 183 a reproduction path determination notification, which includes information indicating that the number of reproductions is limited.

When the reproduction controller 183 receives the reproduction path determination notification from the reproduction path determiner 182, it sets the first decoding processor 121 as an output destination of the first input source selector 111, and sets the third output controller 133 as an output destination of the first decoding processor 121. Next, the reproduction controller 183 sets identification information of the memory device 13 and identification information of the content item C4 to the first input source selector 111.

With the above settings, the first input source selector 111 requests, via the input device selector 101, the memory device 13 to read the video-audio data of the content item C4, demultiplexes the video-audio data read via the input device selector 101 into video stream data, audio stream data, and other stream data for a caption or the like, and outputs them to the first decoding processor 121. The first decoding processor 121 decodes the above various stream data, and outputs the obtained video-audio signal to the third output controller 133.

The third output controller 133 outputs the video signal and audio signal from the first decoding processor 121 to the third monitor 143m and third speaker 143s, respectively. Since the reproduction path determination notification includes the information indicating that the number of reproductions is limited, when the reproduction controller 183 detects the start of decoding of the content item C4, it sends the number-of-reproductions manager 184 a number-of-reproductions consumption notification. When the number-of-reproductions manager 184 receives the number-of-reproductions consumption notification, it decrements by one the allowed number of reproductions of the content item C4, thereby making it '0'.

In the separate reproduction of the content item C4 on the third reproduction channel, regardless of the reproduction position of the content item C4 on the second reproduction channel, the content item C4 is reproduced from its head.

<Eighth Case>

A case will be described where, following the seventh case, the second user gives an instruction to stop the reproduction from the memory device 13 on the second reproduction channel. That is, a case will be described where, in a state in which each of the second and third reproduction channels is performing the separate reproduction of the same content item, a request is made to stop reproduction on one of the two reproduction channels.

In order to stop the reproduction of the content item C4 being viewed, the second user gives, via the second input unit 152, the reproducing device 100 an instruction to stop reproduction.

When the instruction reception unit 170 in the reproducing device 100 receives the reproduction stop instruction from the second user from the second input unit 152, it sends the reproduction controller 183 reproduction stop request information including input unit identification information indicating the second input unit 152, which received the reproduction stop instruction. When the reproduction controller 183 receives the reproduction stop request information, it sends the reproduction stop request information to the reproducibility determiner 181. When the reproducibility determiner 181 receives the reproduction stop request information from the reproduction controller 183, it determines whether the second reproduction channel is in the synchronous reproduction mode. In the present case, the reproducibility determiner 181 determines that it is in the separate reproduction mode, and sends a reproduction stop request to the reproduction path determiner 182.

When the reproduction path determiner 182 receives the reproduction stop request from the reproducibility determiner 181, it sends the reproduction controller 183 a reproduction stop request. When the reproduction controller 183 receives the reproduction stop request, it halts the second input source selector 112 and second decoding processor 122 being used in the second reproduction channel. The reproduction controller 183 then sends the reproduction path determiner 182 a reproduction stop response notification. When the reproduction path determiner 182 receives the reproduction stop response notification, it changes the resource management information table to indicate that no input source selector, decoding processor, or output controller is being used on the second reproduction channel.

<Ninth Case>

A case will be described where, following the eighth case, after the reproduction on the third reproduction channel has been stopped, resulting in a state in which none of the reproduction channels perform reproduction, the user (second user) who uses the second output unit 142 gives an instruction to reproduce a content item C5, which is a moving picture file stored in the memory device 13, on the second reproduction channel. The content item C5 is a limited content item, and its allowed number of reproductions is '2'. The content item C5 has never been reproduced, and its reproduction right presence/absence information is 'absence'.

In the ninth case, as in the sixth case, the control device 160 performs the separate reproduction of the content item C5 by using the second input source selector 112, second decoding processor 122, and second output controller 132; at the start of decoding of the content item C5, the control device 160 decrements by one the allowed number of reproductions of the content item C5, thereby making it '1', and updates the reproduction right presence/absence information of the content item C5 to 'presence'.

<Tenth Case>

A case will be described where, following the ninth case, the user (third user) who uses the third output unit 143 gives an instruction to reproduce the content item C5 on the third reproduction channel. The content item C5 is a limited content item, its allowed number of reproductions is '1', and its reproduction right presence/absence information is 'presence'.

In response to the reproduction instruction for the content item C5 from the third user, the reproducibility determiner 181 reserves the first input source selector 111, first decoding processor 121, and third output controller 133.

After the completion of the above reservations, the reproducibility determiner 181 determines that the content item C5 is a limited content item, the allowed number of reproductions of the content item C5 is one or greater, and the content item C5 is being reproduced on another reproduction channel. The reproducibility determiner 181 then requests the reproduction controller 183 to display the reproduction confirmation screen (FIG. 3). The reproduction controller 183 displays the reproduction confirmation screen (FIG. 3) on the third monitor 143m. Here, the user selects the synchronous reproduction mode; the reproducibility determiner 181 cancels the above reservations, shifts the reproduction mode to the synchronous reproduction mode, and sends the reproduction path determiner 182 reproduction mode information indicating that the synchronous reproduction mode is available.

On the basis of the reproduction mode information from the reproducibility determiner 181, the reproduction path determiner 182 determines a path including the second input source selector 112 and second decoding processor 122 being used in the second reproduction channel that is reproducing the content item C5, and the third output controller 133 corresponding to the third reproduction channel as the reproduction path of the third reproduction channel. The reproduction path determiner 182 then sends the reproduction controller 183 a reproduction path determination notification.

When the reproduction controller 183 receives the reproduction path determination notification from the reproduction path determiner 182, it sets the third output controller 133 as an additional output destination of the second decoding processor 122. With this setting, the second decoding processor 122 outputs a decoded video-audio signal to the second output controller 132 and third output controller 133. The third output controller 133 outputs the video signal and audio signal from the second decoding processor 122 to the third monitor 143m and third speaker 143s, respectively.

As described above, when the synchronous reproduction starts on the third reproduction channel, the second and third reproduction channels share the second input source selector 112 and second decoding processor 122, and reproduce and output the same video-audio signal, so the reproduction mode of the second reproduction channel also shifts from the separate reproduction mode to the synchronous reproduction mode.

<Eleventh Case>

A case will be described where, following the tenth case, the third user gives an instruction for special reproduction of the content item C5 on the third reproduction channel. That is, a case will be described where, in a state in which the second and third reproduction channels are performing the synchronous reproduction of the same content item, one of the two reproduction channels is requested to perform special reproduction. The content item C5 is a limited content item, its allowed number of reproductions is '1', and its reproduction right presence/absence information is 'presence'.

When the control device 160 receives the instruction for special reproduction on the third reproduction channel from the third user, it determines whether the third reproduction channel is in the synchronous reproduction mode. In the present case, the control device 160 determines that it is in the synchronous reproduction mode, and determines whether the separate reproduction of the content item C5 on the third reproduction channel is possible. In the present case, since the first input source selector 111 and first decoding processor 121 are available for the separate reproduction, and the allowed number of reproductions of the content item C5 is one or greater, the control device 160 determines that the separate reproduction is possible. The control device 160 then displays the reproduction confirmation screen (FIG. 4) on the third monitor 143m, and receives a selection of a reproduction mode from the user. Here, the user selects the separate reproduction mode; the control device 160 shifts the reproduction mode of the third reproduction channel to the separate reproduction mode.

Then, the control device 160 determines a path including the first input source selector 111, first decoding processor 121, and third output controller 133 as the reproduction path of the third reproduction channel, and updates the resource management information table. Further, the control device 160 saves resume information indicating the reproduction position of the content item C5 being reproduced in the synchronous reproduction mode. The control device 160 then performs the special reproduction of the content item C5 in the separate reproduction mode from the reproduction position indicated by the resume information, using the first input source selector 111, first decoding processor 121, and third output controller 133. When starting the separate reproduction of the content item C5, the control device 160 decrements by one the allowed number of reproductions of the content item C5, thereby updating it to '0'.

On the other hand, in accordance with the above shift of the reproduction mode of the third reproduction channel, the second reproduction channel shifts from the synchronous reproduction mode to the separate reproduction mode, and continues the reproduction of the content item C5 in the separate reproduction mode. In this case, the special reproduction instruction causes no change in the reproduction status of the second reproduction channel.

If the user selects the synchronous reproduction mode on the reproduction confirmation screen (FIG. 4), the control device 160 executes the special reproduction of the content item C5 on the second and third reproduction channels in the synchronous reproduction mode.

Figure 11:
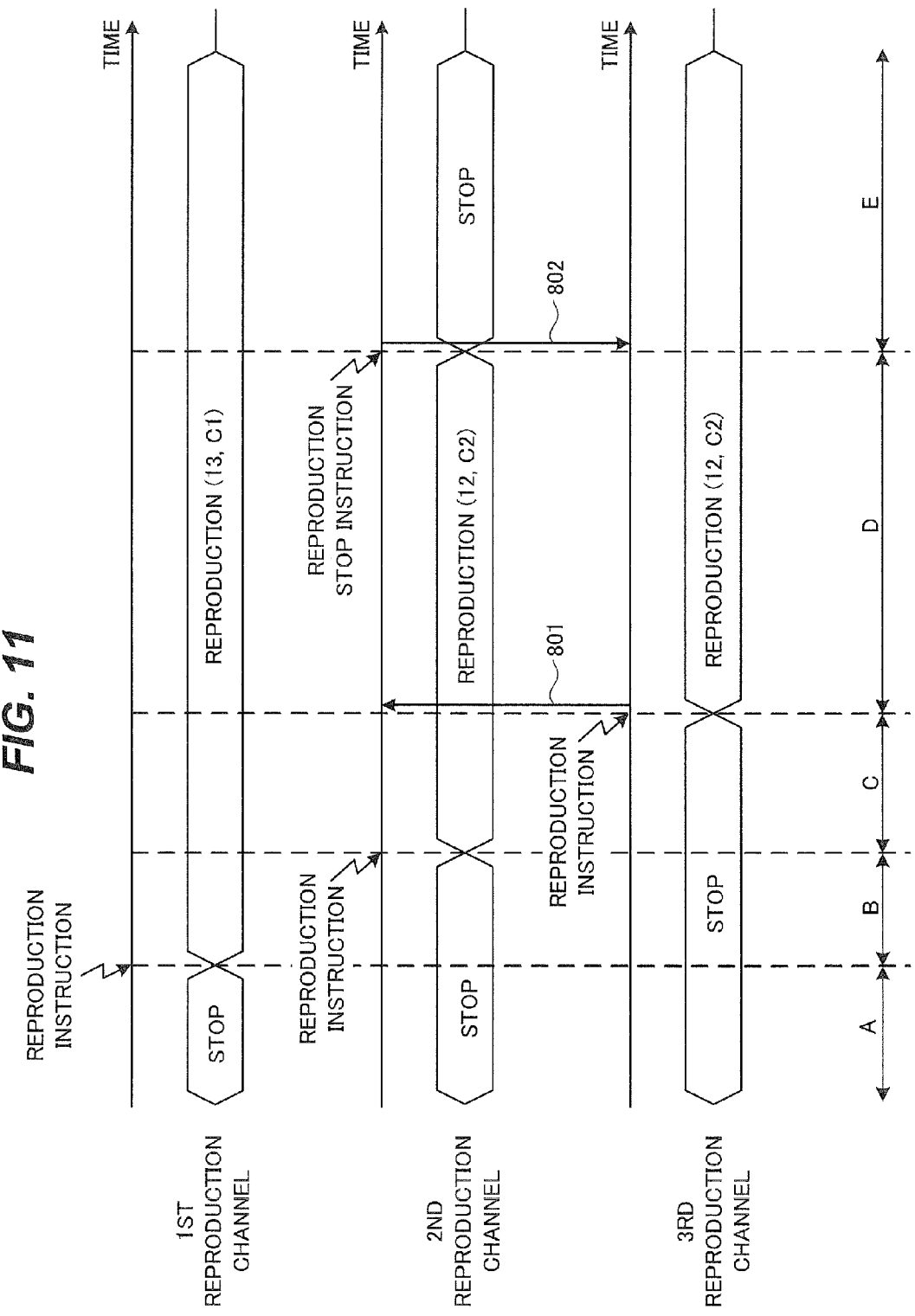
FIG. 11 is a timing diagram showing transitions of reproduction status of respective reproduction channels in first to fifth cases.

FIG. 11 is a timing diagram illustrating transitions of reproduction status of the respective reproduction channels in the above first to fifth cases. In FIG. 11, in the initial interval A, the first, second, and third reproduction channels are all in a reproduction stop state. In the next interval B, the first reproduction channel is in a separate reproduction state in which it performs normal reproduction of the content item C1 from the memory device 13 in accordance with the reproduction instruction from the first user; the second and third reproduction channels are in the reproduction stop state. The state in the interval B corresponds to the resource management information table 400 in FIG. 7. In the next interval C, the first reproduction channel is in the separate reproduction state in which it performs normal reproduction of the content item C1 from the memory device 13; the second reproduction channel is in a separate reproduction state in which it performs normal reproduction of the content item C2 from the optical drive 12 in accordance with the reproduction instruction from the second user; the third reproduction channel is in the reproduction stop state. The state in the interval C corresponds to the resource management information table 500 in FIG. 8. When, in the state in the interval C, the third user gives the reproducing device 100 an instruction to reproduce the content item C2 from the optical drive 12, the reproducing device 100 commences synchronous reproduction of the content item C2 on the third reproduction channel, and then sends a synchronous reproduction initiation notification 801 to the second reproduction channel, causing the second reproduction channel to shift to the synchronous reproduction mode. Accordingly, in the interval D following the interval C, the first reproduction channel is in the separate reproduction state in which it performs normal reproduction of the content item C1 from the memory device 13; the second and third reproduction channels are in a synchronous reproduction state in which they perform normal reproduction of the content item C2 from the optical drive 12. The state in the interval D corresponds to the resource management information table 600 in FIG. 9. When, in the state in the interval D, the second user gives the reproducing device 100 an instruction to stop reproduction, the reproducing device 100 performs a process to stop the reproduction on the second reproduction channel, and then sends a synchronous reproduction termination notification 802 to the third reproduction channel, causing the third reproduction channel to shift to the separate reproduction mode. Accordingly, in the interval E following the interval D, the first reproduction channel is in the separate reproduction state in which it performs normal reproduction of the content item C1 from the memory device 13; the second reproduction channel is in the reproduction stop state; the third reproduction channel is in a separate reproduction state in which it performs normal reproduction of the content item C2 from the optical drive 12. The state in the interval E corresponds to the resource management information table 700 in FIG. 10.

Figure 12:
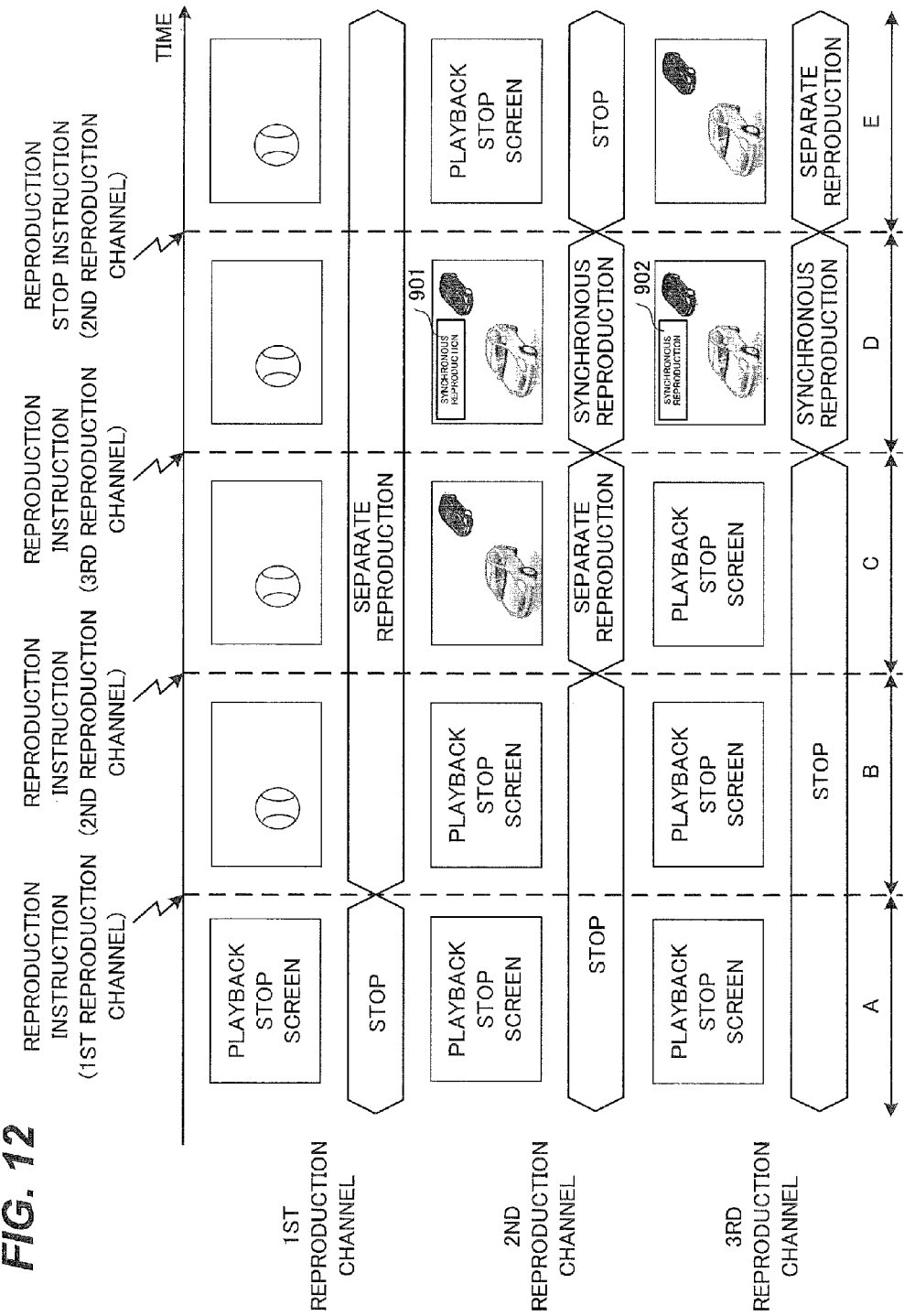
FIG. 12 is a diagram showing transitions of reproduction screens of the respective reproduction channels in the first to fifth cases.

FIG. 12 is a diagram illustrating transitions of reproduction screens of the respective reproduction channels in the above first to fifth cases. The intervals A to E shown in FIG. 12 correspond to the intervals A to E shown in FIG. 11. In FIG. 12, in the interval A, the first, second, and third reproduction channels all display a reproduction stop screen. In the interval B, the first reproduction channel displays the reproduction screen of the content item C1; the second and third reproduction channels display the reproduction stop screen. In the interval C, the first reproduction channel displays the reproduction screen of the content item C1; the second reproduction channel displays the reproduction screen of the content item C2; the third reproduction channel displays the reproduction stop screen. In the interval D, the first reproduction channel displays the reproduction screen of the content item C1; the second and third reproduction channels display the reproduction screens of the content item C2. The reproduction screens on the second and third reproduction channels in the interval D displays messages 901 and 902 indicating that synchronous reproduction is being performed, respectively. In the interval E, the first reproduction channel displays the reproduction screen of the content item C1; the second reproduction channel displays the reproduction stop screen; the third reproduction channel displays the reproduction screen of the content item C2. The display of the messages 901 and 902 is controlled by the control device 160. The control device 160 starts displaying the message 902 when the third reproduction channel starts the synchronous reproduction, and stops displaying the message 902 when the third reproduction channel shifts to the separate reproduction mode. The control device 160 also starts displaying the message 901 when the second reproduction channel shifts to the synchronous reproduction mode, and stops displaying the message 901 when the second reproduction channel stops the reproduction.

Figure 13:
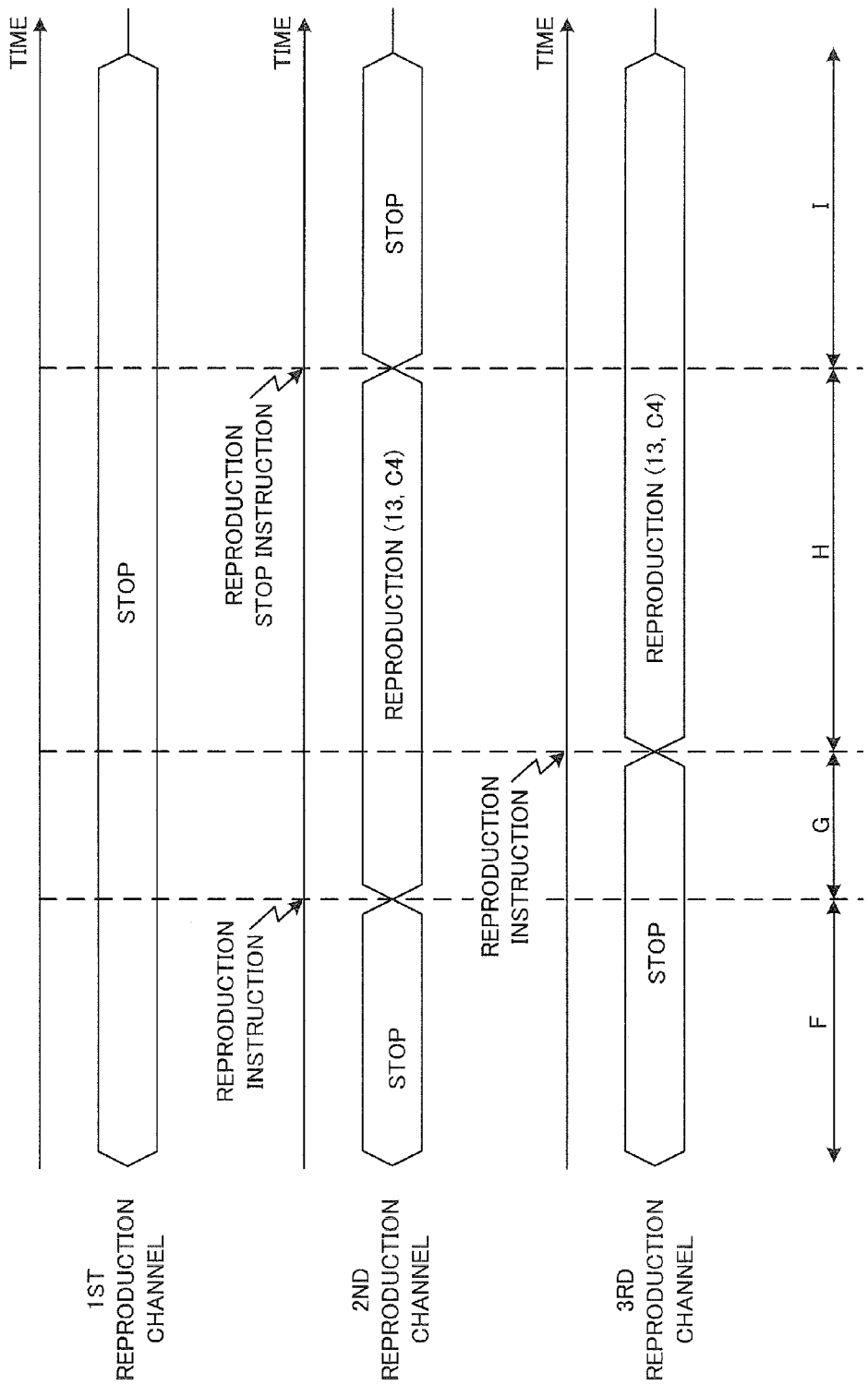
FIG. 13 is a timing diagram showing transitions of reproduction status of the respective reproduction channels in sixth to eighth cases.

FIG. 13 is a timing diagram illustrating transitions of reproduction status of the respective reproduction channels in the above sixth to eighth cases. In FIG. 13, in the initial interval F, the first, second, and third reproduction channels are all in the reproduction stop state. In the next interval G, the second reproduction channel is in a separate reproduction state in which it performs normal reproduction of the content item C4 from the memory device 13 in accordance with the reproduction instruction from the second user; the first and third reproduction channels are in the reproduction stop state. When, in the state in the interval G, the third user gives the reproducing device 100 an instruction to reproduce the content item C4 from the memory device 13, the reproducing device 100 displays the reproduction confirmation screen (FIG. 3), and upon receiving a selection of the separate reproduction mode from the third user, starts separate reproduction of the content item C4 on the third reproduction channel. Accordingly, in the interval H following the interval G, the first reproduction channel is in the reproduction stop state; each of the second and third reproduction channels is in a separate reproduction state in which it performs normal reproduction of the content item C4 from the memory device 13. When, in the state in the interval H, the second user gives the reproducing device 100 an instruction to stop reproduction, the reproducing device 100 performs a process to stop the reproduction on the second reproduction channel. Accordingly, in the interval I following the interval H, the first and second reproduction channels are in the reproduction stop state; the third reproduction channel is in the separate reproduction state in which it performs normal reproduction of the content item C4 from the memory device 13.

Figure 14:
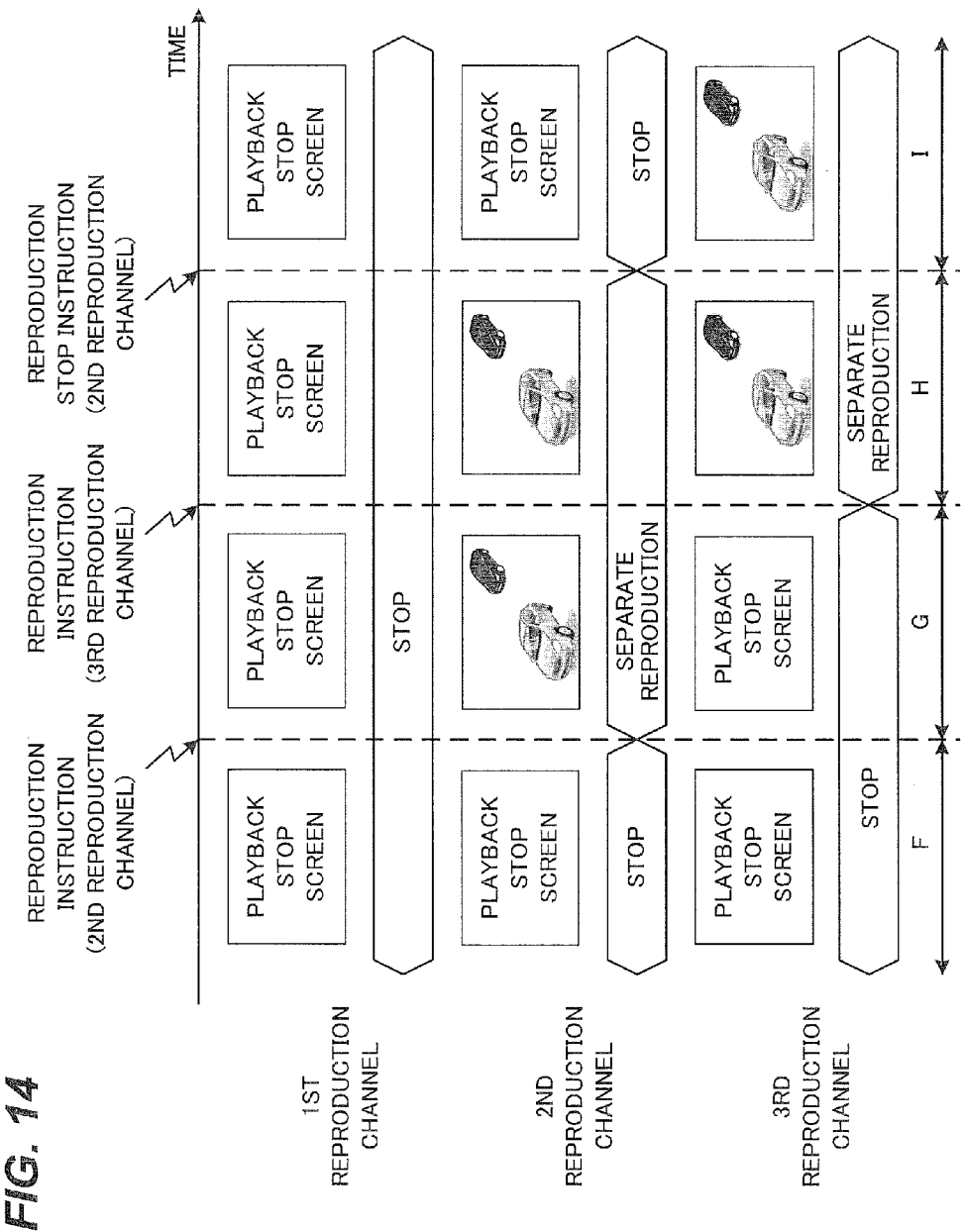
FIG. 14 is a diagram showing transitions of reproduction screens of the respective reproduction channels in the sixth to eighth cases.

FIG. 14 is a diagram illustrating transitions of reproduction screens of the respective reproduction channels in the above sixth to eighth cases. The intervals F to I shown in FIG. 14 correspond to the intervals F to I shown in FIG. 13. In FIG. 14, in the interval F, the first, second, and third reproduction channels all display a reproduction stop screen. In the interval G, the second reproduction channel displays the reproduction screen of the content item C4; the first and third reproduction channels display the reproduction stop screen. In the interval H, the first reproduction channel displays the reproduction stop screen; the second and third reproduction channels display the reproduction screens of the content item C4. The reproduction screens on the second and third reproduction channels in the interval H display no message indicating that synchronous reproduction is being performed. In the interval I, the first and second reproduction channels display the reproduction stop screen; the third reproduction channel displays the reproduction screen of the content item C4.

Figure 15:
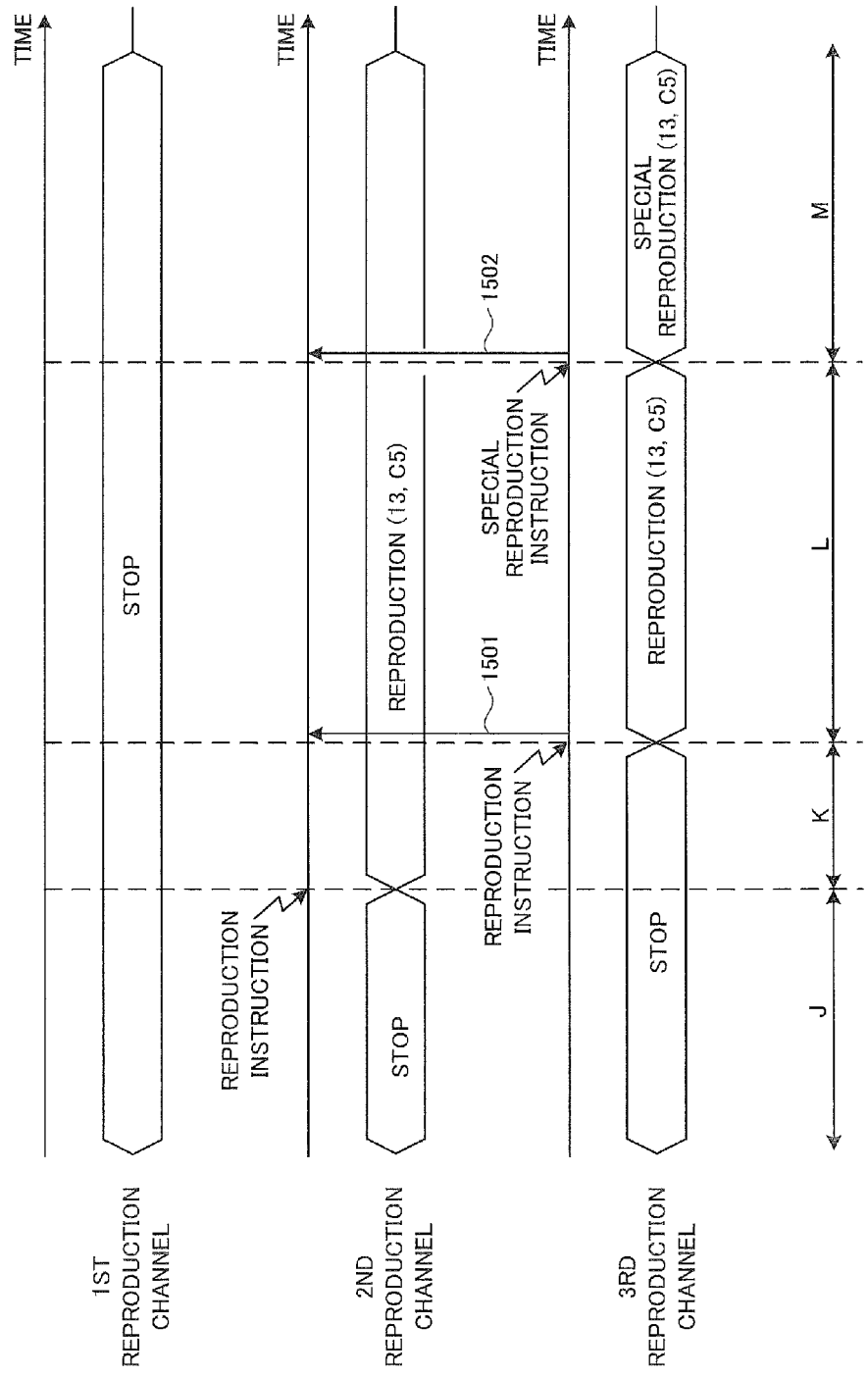
FIG. 15 is a timing diagram showing transitions of reproduction status of the respective reproduction channels in ninth to eleventh cases.

FIG. 15 is a timing diagram illustrating transitions of reproduction status of the respective reproduction channels in the above ninth to eleventh cases. In FIG. 15, in the initial interval J, the first, second, and third reproduction channels are all in the reproduction stop state. In the next interval K, the second reproduction channel is in a separate reproduction state in which it performs normal reproduction of the content item C5 from the memory device 13 in accordance with the reproduction instruction from the second user; the first and third reproduction channels are in the reproduction stop state. When, in the state in the interval K, the third user gives the reproducing device 100 an instruction to reproduce the content item C5 from the memory device 13, the reproducing device 100 displays the reproduction confirmation screen (FIG. 3), and upon receiving a selection of the synchronous reproduction mode from the third user, commences synchronous reproduction of the content item C5 on the third reproduction channel. The reproducing device 100 then sends a synchronous reproduction initiation notification 1501 to the second reproduction channel, causing the second reproduction channel to shift to the synchronous reproduction mode. Accordingly, in the interval L following the interval K, the first reproduction channel is in the reproduction stop state; the second and third reproduction channels are in a synchronous reproduction state in which they perform normal reproduction of the content item C5 from the memory device 13. When, in the state in the interval L, the third user gives the reproducing device 100 a special reproduction instruction, the reproducing device 100 displays the reproduction confirmation screen (FIG. 4), and upon receiving a selection of the separate reproduction mode from the third user, commences the special reproduction of the content item C5 in the separate reproduction mode on the third reproduction channel. The reproducing device 100 then sends a synchronous reproduction termination notification 1502 to the second reproduction channel, causing the second reproduction channel to shift to the separate reproduction mode. Accordingly, in the interval M following the interval L, the first reproduction channel is in the reproduction stop state; the second reproduction channel is in a separate reproduction state in which it performs normal reproduction of the content item C5 from the memory device 13; the third reproduction channel is in a separate reproduction state in which it performs special reproduction of the content item C5 from the memory device 13.

Figure 16:
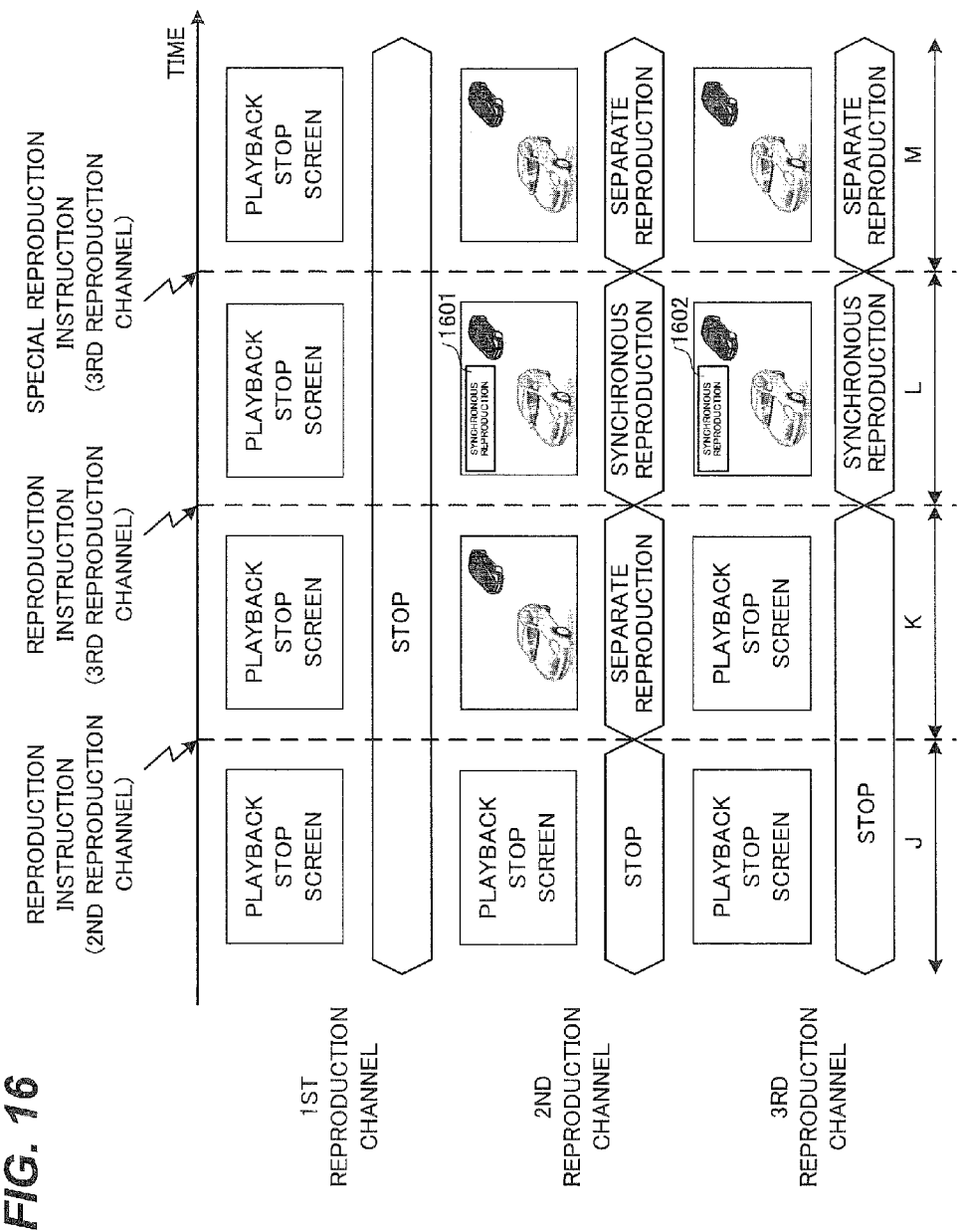
FIG. 16 is a diagram showing transitions of reproduction screens of the respective reproduction channels in the ninth to eleventh cases.

FIG. 16 is a diagram illustrating transitions of reproduction screens of the respective reproduction channels in the above ninth to eleventh cases. The intervals J to M shown in FIG. 16 correspond to the intervals J to M shown in FIG. 15. In FIG. 16, in the interval J, the first, second, and third reproduction channels all display reproduction stop screens. In the interval K, the second reproduction channel displays the reproduction screen of the content item C5; the first and third reproduction channels display the reproduction stop screens. In the interval L, the first reproduction channel displays the reproduction stop screen; the second and third reproduction channels display the reproduction screens of the content item C5. The reproduction screens on the second and third reproduction channels in the interval L display messages 1601 and 1602 indicating that synchronous reproduction is being performed, respectively. In the interval M, the first reproduction channel displays the reproduction stop screen; the second reproduction channel displays the reproduction screen of normal reproduction of the content item C5; the third reproduction channel displays the reproduction screen of special reproduction of the content item C5. The display of the messages 1601 and 1602 is controlled by the control device 160. The control device 160 starts displaying the message 1602 when the third reproduction channel starts the synchronous reproduction, and stops displaying the message 1602 when the third reproduction channel shifts to the separate reproduction mode. The control device 160 also starts displaying the message 1601 when the second reproduction channel shifts to the synchronous reproduction mode, and stops displaying the message 1601 when the second reproduction channel shifts to the separate reproduction mode.

The following advantages can be obtained from this embodiment described above.

(1) In this embodiment, in a reproducing device that includes a plurality of decoding processors for performing decoding processing on a content item, and a plurality of output controllers for reproducing and outputting the content item after the decoding processing, when a control device reproduces a limited content item, it decrements the allowed number of reproductions of the content item if it performs the separate reproduction, and does not decrement the allowed number of reproductions of the content item if it performs the synchronous reproduction. Thus, according to this embodiment, it is possible to appropriately manage the allowed number of reproductions of the limited content item in accordance with the reproduction mode (separate reproduction or synchronous reproduction). Specifically, it is possible to prevent a situation where the allowed number of reproductions is decremented at the time of the separate reproduction and further decremented at the time of the synchronous reproduction, that is, a situation where the allowed number of reproductions is consumed redundantly. This makes it possible to prevent the allowed number of reproductions from being consumed inappropriately, thereby improving convenience of the user.

(2) While synchronous reproduction of a limited content item by at least two output controllers is being performed, when the control device receives a reproduction stop instruction with respect to one of the at least two output controllers, the control device stops the reproduction of the content item by the output controller to which the reproduction stop instruction is directed, and continues the reproduction of the content item by the other one or more output controllers. This makes it possible to prevent stoppage of reproduction unintended by one or more users of the other one or more output controllers (or reproduction channels).

(3) While synchronous reproduction of a limited content item by at least two output controllers is being performed, when the control device receives a reproduction stop instruction with respect to one of the at least two output controllers, the control device does not update the reproduction right presence/absence information of the content item. This makes it possible to prevent invalidation of the reproduction right unintended by a user of another output controller (or reproduction channel) of the at least two output controllers, other than the output controller to which the reproduction stop instruction is directed.

(4) When the control device determines that the separate reproduction of a limited content item is possible, it indicates that the allowed number of reproductions of the content item is decremented if the separate reproduction is executed, receives from a user a selection as to whether to execute the separate reproduction, and executes the separate reproduction if the execution of the separate reproduction is selected. This configuration makes it possible to inform the user that the separate reproduction consumes the allowed number of reproductions and then allow the user to select whether to execute the separate reproduction, thereby improving convenience of the user.

(5) When the control device determines that the separate reproduction and synchronous reproduction of a limited content item are possible, it indicates that the allowed number of reproductions of the content item is decremented if the separate reproduction is executed, and the allowed number of reproductions of the content item is not decremented if the synchronous reproduction is executed, receives from a user a selection as to which of the two reproductions is to be executed, and executes the reproduction selected by the user. This configuration makes it possible to inform the user that the separate reproduction consumes the allowed number of reproductions but the synchronous reproduction does not consume it and then allow the user to select which of the separate reproduction and synchronous reproduction to execute, thereby improving convenience of the user.

(6) While synchronous reproduction of a content item by at least two output controllers is being performed, when the control device receives a special reproduction instruction with respect to one of the at least two output controllers, the control device executes special reproduction of the content item by the output controller to which the special reproduction instruction is directed, by decoding the content item using a decoding processor differing from the decoding processor being used for the synchronous reproduction, and continues the reproduction of the content item by the other one or more of the at least two output controllers, to which the special reproduction instruction is not directed. For example, while the synchronous reproduction of a limited content item by at least two output controllers is being performed, when the control device receives a special reproduction instruction with respect to one of the at least two output controllers, if the control device determines that it is possible to perform reproduction (separate reproduction) of the content item by the output controller to which the special reproduction instruction is directed, by use of a decoding processor differing from that for the other one or more of the at least two output controllers, differing from the output controller to which the special reproduction instruction is directed, the control device executes special reproduction of the content item by the output controller to which the special reproduction instruction is directed by use of a decoding processor differing from that for the other one or more output controllers, and continues reproduction of the content item by the other one or more output controllers. This configuration makes it possible to prevent change in reproduction status unintended by one or more users of the other one or more output controllers (or reproduction channels). This makes it possible, for example, to execute special reproduction on the reproduction channel to which the special reproduction instruction is directed, without interfering with viewing by one or more users of the other one or more reproduction channels.

(7) When, in the above item (6), the control device determines that it is possible to perform reproduction (separate reproduction) of the content item by the output controller to which the special reproduction instruction is directed by use of a decoding processor differing from that for the other one or more output controllers, it indicates that the allowed number of reproductions of the content item is decremented if reproduction (separate reproduction) by use of a decoding processor differing from that for the other one or more output controllers is executed, and the allowed number of reproductions of the content item is not decremented if reproduction (synchronous reproduction) by use of the same decoding processor as that for the other one or more output controllers is executed, receives from a user a selection as to which of the two reproductions to execute, and executes the reproduction selected by the user. This configuration makes it possible to inform the user that the separate reproduction consumes the allowed number of reproductions but the synchronous reproduction does not consume it and then allow the user to select which of the separate reproduction and synchronous reproduction to execute, thereby improving convenience of the user.

(8) In the above item (6), the control device may indicate that the allowed number of reproductions of the content item is decremented if the special reproduction of the content item is executed and the allowed number of reproductions of the content item is not decremented if the synchronous reproduction is continued, receive from a user a selection as to which of the special reproduction and synchronous reproduction is to be executed, execute the special reproduction if the special reproduction is selected, and continue the synchronous reproduction by the at least two output controllers without executing the special reproduction if the synchronous reproduction is selected. This configuration makes it possible to inform the user that the special reproduction consumes the allowed number of reproductions but the synchronous reproduction does not consume it and then allow the user to select which of the special reproduction and synchronous reproduction to execute, thereby improving convenience of the user.

The reproducing device in the above embodiment may be configured as follows.

(a) The above description illustrates a configuration including two input source selectors, two decoding processors, and three output controllers, but each of the numbers of the input source selectors, decoding processors, and output controllers is not limited to this. The number of input source selectors may be one, three, or more; the number of decoding processors may be three or more; the number of output controllers may be two, four, or more.

(b) When the controller 180 causes one of the output controllers to output a list of content, it determines, for each of one or more content items included in the list, without consideration of limitation of the number of reproductions of content, on the basis of the usage status of the decoding processors, assuming that the content item is to be reproduced, whether it is possible to perform reproduction (or separate reproduction) of the content item by the output controller that outputs the list by use of a decoding processor that is not being used for reproduction by another output controller other than the output controller that outputs the list, and whether it is possible to perform reproduction (or synchronous reproduction) of the content item by the output controller that outputs the list by use of a decoding processor that is being used for reproduction of the content item by another output controller other than the output controller that outputs the list, and causes the output controller that outputs the list to output the results of these determinations. Further, for each limited content item of the one or more content items included in the list, the controller 180 may cause the output controller that outputs the list to output information indicating whether the content item is allowed to be reproduced according to the limitation of the number of reproductions of the content item. Such information includes the allowed number of reproductions, the reproduction right presence/absence information, the result of determination as to whether the allowed number of reproductions is one or greater, and the like.

For example, when the controller 180 causes a particular output unit to display a reproduction list, it determines, for each content item listed in the reproduction list, without consideration of limitation of the number of reproductions, whether the separate reproduction is possible and whether the synchronous reproduction is possible, and causes the output unit to display the results of these determinations. FIG. 17 shows an example of display of the reproduction list. The example in FIG. 17 displays, for each of content items C11 to C16, whether the separate reproduction is possible and whether the synchronous reproduction is possible, without consideration of limitation of the number of reproductions. The circles indicate that the reproduction is possible, and the crosses indicate that the reproduction is not possible. For a limited content item, information on the allowed number of reproductions, or the reproduction right presence/absence information may be displayed additionally. In the example of FIG. 17, information on the allowed number of reproductions is added.

This aspect allows the user to know in advance, for each content item in the list, whether the separate reproduction is possible when the limitation of the number of reproductions is not considered, whether the synchronous reproduction is possible, whether the reproduction is possible according to the limitation of the number of reproductions, or the like. This allows the user to easily find a content item that can be reproduced, improving convenience of the user.

(c) When a reproduction instruction for a content item is received, even if the separate reproduction is possible, if the content item is being reproduced by another output unit other than the output unit to which the reproduction instruction is directed, the controller 180 may perform synchronous reproduction of the content item. For example, when the instruction reception unit 170 receives a synchronous reproduction instruction for a content item, the controller 180 determines whether the content item is being reproduced by another output unit, and if so, performs the synchronous reproduction with the other output unit. In this configuration, when a user of a particular reproduction channel wishes to perform synchronous reproduction of the content item identical to a content item being reproduced on another reproduction channel by another user, the user of the particular reproduction channel can instruct the reproducing device 100 to perform synchronous reproduction of the content item and view the content item in the synchronous reproduction mode. For example, in the reproduction list in FIG. 17, for the content items C11 to C15, synchronous reproduction is possible and the user can intentionally perform synchronous reproduction. The controller 180 may receive a synchronous reproduction instruction from a user on a reproduction list as shown in FIG. 17.

For example, in a state where separate reproduction of the content item C11 is performed on the first reproduction channel and no reproduction is performed on the second and third reproduction channels, when the controller 180 receives from a user an instruction for synchronous reproduction of the content item C11 by the second output unit 142, it determines the input source selector and decoding processor being used in the reproduction channel that is reproducing the content item C11 as the input source selector and decoding processor for the second reproduction channel, determines the second output controller 132 corresponding to the second output unit 142 as the output controller for the second reproduction channel, and performs synchronous reproduction of the content item C11 by the second output unit 142.

This aspect makes it possible, by performing synchronous reproduction, to view the same limited content item as on another reproduction channel, without consuming the allowed number of reproductions.

(d) When the controller 180 receives an instruction for processing due to which the reproduction right is invalidated (or the reproduction right presence/absence information is updated to 'absence'), it may indicate that the reproduction right is invalidated if the processing is executed, receive from a user whether to allow execution of the processing, and execute the requested processing if the user allows the execution. For example, when the controller 180 receives a reproduction stop request from a user, it displays a confirmation screen, as shown in FIG. 18, for confirming invalidation of the reproduction right. The confirmation screen of FIG. 18 is configured to indicate that the reproduction right is lost if the reproduction stop is executed but the reproduction right is not lost if the reproduction stop is not executed, and receive from a user a selection as to whether to execute the reproduction stop. The controller 180 then executes the reproduction stop if the user selects execution of the reproduction stop, and does not execute the reproduction stop if the user selects cancellation of the reproduction stop.

This aspect makes it possible, when an instruction for processing due to which the reproduction right is invalidated is received from a user, before execution of the requested processing, to inform the user that the allowed number of reproductions is consumed if the processing is executed, and allows the user to select whether to execute the processing, improving convenience of the user.

(e) In the above description, the reproducibility determiner 181 determines reproducibility on the basis of the allowed number of reproductions, but the reproduction controller 183 may determine reproducibility on the basis of the allowed number of reproductions. Specifically, after the reproducibility determiner 181 determines, regardless of the allowed number of reproductions, on the basis of the usage status of the input source selector and decoding processor, whether separate reproduction is possible and whether synchronous reproduction is possible, the reproduction controller 183 may determine whether reproduction is possible on the basis of the allowed number of reproductions. For example, after the reproduction path determiner 182 determines a reproduction path on the basis of the determination by the reproducibility determiner 181, in the case of separate reproduction of a limited content item, the reproduction controller 183 executes the separate reproduction if the allowed number of reproductions of the content item is one or more, and informs a user that the reproduction is not possible if the allowed number of reproductions is zero; in the case of reproduction other than separate reproduction of a limited content item, the reproduction controller 183 executes reproduction on the determined reproduction path without determination according to the allowed number of reproductions.

In the embodiment described above, the functions of the control device may be implemented purely by hardware resources such as electronic circuits, or may be implemented by cooperation between hardware resources and software. When implemented by cooperation between hardware resources and software, the functions of the control device are implemented by, for example, execution of a control program by a computer. More specifically, the functions of the control device are implemented in such a way that a control program stored in a recording medium such as a read only memory (ROM) is read into a main memory and executed by a central processing unit (CPU). The control program may be provided by being stored in a computer-readable recording medium such as an optical disc, or may be provided through communication lines such as the Internet.

The present invention is not limited to the embodiment described above; it can be practiced in various other aspects without departing from the inventive scope.

REFERENCE CHARACTERS

11 external input device, 12 optical drive, 13 memory device, 14 portable AV device, 15 network device, 100 reproducing device, 101 input device selector, 111 first input source selector, 112 second input source selector, 121 first decoding processor, 122 second decoding processor, 131 first output controller, 132 second output controller, 133 third output controller, 141 first output unit, 142 second output unit, 143 third output unit, 151 first input unit, 152 second input unit, 153 third input unit, 160 control device, 170 instruction reception unit, 180 controller, 181 reproducibility determiner, 182 reproduction path determiner, 183 reproduction controller, 184 number-of-reproductions manager.

What is claimed is:

1. A reproducing device comprising:
a plurality of decoding processors for decoding a content item to be audibly and/or visually reproduced and a plurality of output controllers for audibly and/or visually reproducing and outputting the content item decoded by one of the plurality of decoding processors, said reproducing device using said plurality of decoding processors to perform,
synchronous reproduction for audibly and/or visually reproducing the content item decoded by one of the plurality of decoding processors by at least two of the plurality of output controllers in synchronization, and
separate reproduction for audibly and/or visually reproducing the content item decoded by one of the plurality of decoding processors by one of the plurality of output controllers;
a computer processing unit (CPU); and
a memory coupled to the CPU, wherein the memory stores a program which, when executed by the CPU, performs a process including,
managing an allowed number of audible and/or visual reproductions of the content item;
determining, when a reproduction instruction for the content item with respect to one of the plurality of output controllers is given, on a basis of the managed allowed number of audible and/or visual reproductions of the content item, whether the separate reproduction by the output controller to which the reproduction instruction is directed is possible and whether the synchronous reproduction by the output controller to which the reproduction instruction is directed is possible; and
performing the separate reproduction or the synchronous reproduction by the output controller to which the reproduction instruction is directed, on a basis of the determination;
wherein, according to the managing, the allowed number of audible and/or visual reproductions of the content item is decremented by one when the separate reproduction is performed, and the allowed number of audible and/or visual reproductions of the content item is not decremented when the synchronous reproduction is performed;
wherein, the synchronous reproduction of the content item is determined to be possible in response to the reproduction instruction when the content item is already being audibly and/or visually reproduced according to a separate reproduction, which was previously determined to be possible based on the managed allowed number of audible and/or visual reproductions and which caused the managed allowed number of reproductions to be decremented by one; and
wherein the plurality of decoding processors and the plurality of output controllers are controlled by the same CPU.

2. The reproducing device of claim 1, wherein in determining whether the separate reproduction is possible, the process determines that the separate reproduction is possible if the allowed number of audible and/or visual reproductions of the content item is one or more, and determines that the separate reproduction is not possible if the allowed number of audible and/or visual reproductions of the content item is zero.

3. The reproducing device of claim 1, wherein in determining whether the separate reproduction is possible, the process determines, on a basis of usage status of the plurality of decoding processors, whether there is a decoding processor available for the separate reproduction, determines that the separate reproduction is possible if it is determined that there is an available decoding processor and the allowed number of audible and/or visual reproductions of the content item is one or more, and determines that the separate reproduction is not possible if it is determined that there is no available decoding processor or if the allowed number of audible and/or visual reproductions of the content item is zero.

4. The reproducing device of claim 1, wherein in determining whether the synchronous reproduction is possible, regardless of the allowed number of audible and/or visual reproductions of the content item, the process determines that the synchronous reproduction is possible if the content item is being audibly and/or visually reproduced by another output controller other than the output controller to which the reproduction instruction is directed, and determines that the synchronous reproduction is not possible if the content item is not being audibly and/or visually reproduced.

5. The reproducing device of claim 1, wherein while the synchronous reproduction is being performed by at least two of the plurality of output controllers, when the reproducing device receives a reproduction stop instruction with respect to one of the at least two output controllers, the reproducing device stops audible and/or visual reproduction of the content item by the output controller to which the reproduction stop instruction is directed, and continues audible and/or visual reproduction of the content item by the other one or more of the at least two output controllers, other than the output controller to which the reproduction stop instruction is directed.

6. The reproducing device of claim 1, wherein when the process determines that the separate reproduction is possible, the reproducing device indicates that the allowed number of audible and/or visual reproductions of the content item is decremented if the separate reproduction is executed, receives from a user a selection as to whether to execute the separate reproduction, and executes the separate reproduction if execution of the separate reproduction is selected.

7. The reproducing device of claim 1, wherein when the process determines that the separate reproduction is possible and the synchronous reproduction is possible, the reproducing device indicates that the allowed number of audible and/or visual reproductions of the content item is decremented if the separate reproduction is executed and the allowed number of audible and/or visual reproductions of the content item is not decremented if the synchronous reproduction is executed, receives from a user a selection as to which of the two reproductions is to be executed, and executes the reproduction selected by the user.

8. The reproducing device of claim 1, wherein while the synchronous reproduction is being performed by at least two of the plurality of output controllers, when the reproducing device receives a special reproduction instruction with respect to one of the at least two output controllers, the reproducing device executes special reproduction of the content item by the output controller to which the special reproduction instruction is directed, by decoding the content item using a decoding processor differing from the decoding processor being used for the synchronous reproduction, and continues audible and/or visual reproduction of the content item by the other one or more of the at least two output controllers, to which the special reproduction instruction is not directed.

9. The reproducing device of claim 8, wherein the reproducing device indicates that the allowed number of audible and/or visual reproductions of the content item is decremented if the special reproduction of the content item is executed and the allowed number of audible and/or visual reproductions of the content item is not decremented if the synchronous reproduction is continued, receives from a user a selection as to which of the two reproductions is to be executed, executes the special reproduction if the special reproduction is selected, and continues the synchronous reproduction by the at least two output controllers if the synchronous reproduction is selected.

10. The reproducing device of claim 1, wherein when causing one of the plurality of output controllers to output a list of content, the reproducing device determines, for each of one or more content items included in the list, on a basis of usage status of the plurality of decoding processors, assuming that the content item is to be audibly and/or visually reproduced, whether the separate reproduction is possible and whether the synchronous reproduction is possible, and causes the output controller to output the results of the determinations; and of the one or more content items included in the list, for each content item to which limitation on the number of audible and/or visual reproductions is imposed, the reproducing device causes the output controller to further output information indicating whether the content item can be audibly and/or visually reproduced according to the allowed number of audible and/or visual reproductions of the content item.

11. The reproducing device of claim 1, further comprising one or more input source selectors for selecting the content item to be audibly and/or visually reproduced from among a plurality of content items to output the content item to one of the plurality of decoding processors, wherein:

when a reproduction instruction for one of the plurality of content items with respect to one of the plurality of output controllers is given, the process determines whether the separate reproduction is possible and whether the synchronous reproduction is possible, on a basis of usage status of the one or more input source selectors and the plurality of decoding processors, and further on a basis of the managed allowed number of audible and/or visual reproductions of the content item to which the reproduction instruction is directed, if the content item to which the reproduction instruction is directed is a content item to which limitation on the number of audible and/or visual reproductions is imposed; and the process further comprises: selecting, on a basis of the determination, from among the plurality of decoding processors and the plurality of output controllers, a decoding processor and an output controller to be used for audible and/or visual reproduction of the content item to which the reproduction instruction is directed.

12. A control device for controlling a reproducing device that includes a plurality of decoding processors for decoding a content item to be audibly and/or visually reproduced and a plurality of output controllers for audibly and/or visually reproducing and outputting the content item decoded by one of the plurality of decoding processors, said reproducing device using said plurality of decoding processors to perform synchronous reproduction for audibly and/or visually reproducing the content item decoded by one of the plurality of decoding processors by at least two of the plurality of output controllers in synchronization, and separate reproduction for audibly and/or visually reproducing the content item decoded by one of the plurality of decoding processors by one of the plurality of output controllers, the control device comprising:

a computer processing unit (CPU); and
a memory coupled to the CPU, wherein the memory stores a program which, when executed by the CPU, performs a process including,
    managing an allowed number of audible and/or visual reproductions of the content item;
    determining, when a reproduction instruction for the content item with respect to one of the plurality of output controllers is given, on a basis of the managed allowed number of audible and/or visual reproductions of the content item, whether the separate reproduction by the output controller to which the reproduction instruction is directed is possible and whether the synchronous reproduction by the output controller to which the reproduction instruction is directed is possible; and performing the separate reproduction or the synchronous reproduction by the output controller to which the reproduction instruction is directed, on a basis of the determination;

wherein, according to the managing, the allowed number of audible and/or visual reproductions of the content item is decremented by one when the separate reproduction is performed, and the allowed number of audible and/or visual reproductions of the content item is not decremented when the synchronous reproduction is performed;

wherein, the synchronous reproduction of the content item is determined to be possible in response to the reproduction instruction when the content item is already being audibly and/or visually reproduced according to a separate reproduction, which was previously determined to be possible based on the managed allowed number of audible and/or visual reproductions and which caused the managed allowed number of audible and/or visual reproductions to be decremented by one; and wherein the plurality of decoding processors and the plurality of output controllers are controlled by the same CPU.

13. A control method for controlling a reproducing device that includes a plurality of decoding processors for decoding a content item to be audibly and/or visually reproduced and a plurality of output controllers for audibly and/or visually reproducing and outputting the content item decoded by one of the plurality of decoding processors, said reproducing device using said plurality of decoding processors to perform synchronous reproduction for audibly and/or visually reproducing the content item decoded by one of the plurality of decoding processors by at least two of the plurality of output controllers in synchronization, and separate reproduction for audibly and/or visually reproducing the content item decoded by one of the plurality of decoding processors by one of the plurality of output controllers, the control method comprising:

managing an allowed number of audible and/or visual reproductions of the content item;

determining, when a reproduction instruction for the content item with respect to one of the plurality of output controllers is given, on a basis of the managed allowed number of audible and/or visual reproductions of the content item, whether the separate reproduction by the output controller to which the reproduction instruction is directed is possible and whether the synchronous reproduction by the output controller to which the reproduction instruction is directed is possible; and performing the separate reproduction or the synchronous reproduction by the output controller to which the reproduction instruction is directed, on a basis of the determination;

wherein, according to the managing, the allowed number of audible and/or visual reproductions of the content item is decremented by one when the separate reproduction is performed, and the allowed number of audible and/or visual reproductions of the content item is not decremented when the synchronous reproduction is performed;

wherein, the synchronous reproduction of the content item is determined to be possible in response to the reproduction instruction when the content item is already being audibly and/or visually reproduced according to a separate reproduction, which was previously determined to be possible based on the managed allowed number of audible and/or visual reproductions and which caused the managed allowed number of audible and/or visual reproductions to be decremented by one; and wherein the plurality of decoding processors and the plurality of output controllers are controlled by a same CPU.

14. A non-transitory computer-readable storage medium storing a control program for controlling a reproducing device that includes a plurality of decoding processors for decoding a content item to be audibly and/or visually reproduced and a plurality of output controllers for audibly and/or visually reproducing and outputting the content item decoded by one of the plurality of decoding processors, said reproducing device using said plurality of decoding processors to perform synchronous reproduction for audibly and/or visually reproducing the content item decoded by one of the plurality of decoding processors by at least two of the plurality of output controllers in synchronization, and separate reproduction for audibly and/or visually reproducing the content item decoded by one of the plurality of decoding processors by one of the plurality of output controllers, the control program causing a computer processing unit (CPU) to execute:

managing an allowed number of audible and/or visual reproductions of the content item;

determining, when a reproduction instruction for the content item with respect to one of the plurality of output controllers is given, on a basis of the managed allowed number of audible and/or visual reproductions of the content item, whether the separate reproduction by the output controller to which the reproduction instruction is directed is possible and whether the synchronous reproduction by the output controller to which the reproduction instruction is directed is possible; and performing the separate reproduction or the synchronous reproduction by the output controller to which the reproduction instruction is directed, on a basis of the determination;

wherein, according to the managing, the allowed number of audible and/or visual reproductions of the content item is decremented when the separate reproduction is performed, and the allowed number of audible and/or visual reproductions of the content item is not decremented when the synchronous reproduction is performed;

wherein, the synchronous reproduction of the content item is determined to be possible in response to the reproduction instruction when the content item is already being audibly and/or visually reproduced according to a separate reproduction, which was previously determined to be possible based on the managed allowed number of audible and/or visual reproductions and which caused the managed allowed number of audible and/or visual reproductions to be decremented by one; and wherein the plurality of decoding processors and the plurality of output controllers are controlled by the same CPU.

* * * * *